(12) United States Patent
Wu et al.

(10) Patent No.: US 10,859,801 B2
(45) Date of Patent: Dec. 8, 2020

(54) OPTICAL IMAGE CAPTURING SYSTEM, IMAGING APPARATUS AND ELECTRONIC DEVICE

(71) Applicant: LARGAN PRECISION CO., LTD., Taichung (TW)

(72) Inventors: Chien-Hsun Wu, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 421 days.

(21) Appl. No.: 15/710,966

(22) Filed: Sep. 21, 2017

(65) Prior Publication Data
US 2019/0041610 A1   Feb. 7, 2019

(30) Foreign Application Priority Data
Aug. 1, 2017  (TW) .............................. 106125880 A

(51) Int. Cl.
| G02B 13/18 | (2006.01) |
| G02B 13/06 | (2006.01) |
| G02B 13/00 | (2006.01) |
| G02B 9/60  | (2006.01) |
| G02B 7/04  | (2006.01) |

(52) U.S. Cl.
CPC .............. G02B 13/18 (2013.01); G02B 7/04 (2013.01); G02B 9/60 (2013.01); G02B 13/00 (2013.01); G02B 13/06 (2013.01)

(58) Field of Classification Search
CPC . G02B 13/18; G02B 7/04; G02B 9/60; G02B 13/00; G02B 13/06; G02B 7/32; G02B 13/0045

USPC .................................................. 359/713, 714
See application file for complete search history.

(56) References Cited

U.S. PATENT DOCUMENTS

| 6,867,933 | B2 | 3/2005 | Matsusaka |
| 8,743,480 | B2 | 6/2014 | Hsueh et al. |
| 8,947,790 | B2 | 2/2015 | Tsai et al. |
| 9,097,877 | B2 | 8/2015 | Tsai et al. |
| 9,488,807 | B2 | 11/2016 | Liao et al. |
| 2011/0176049 | A1* | 7/2011 | Hsieh ................. G02B 13/0045 348/340 |
| 2013/0050846 | A1* | 2/2013 | Huang ............... G02B 13/0045 359/713 |
| 2014/0362454 | A1* | 12/2014 | Tsai ...................... G02B 13/004 359/714 |

(Continued)

FOREIGN PATENT DOCUMENTS

| CN | 201654312 U | 11/2010 |
| CN | 107065126 A | 8/2017 |

(Continued)

*Primary Examiner* — William R Alexander
*Assistant Examiner* — Alberto J Betancourt
(74) *Attorney, Agent, or Firm* — Locke Lord LLP; Tim Tingkang Xia, Esq.

(57) ABSTRACT

An optical image capturing system includes five lens elements, the five lens elements being, in order from an object side to an image side: a first lens element; a second lens element having positive refractive power; a third lens element having positive refractive power; a fourth lens element; and a fifth lens element having an image-side surface being concave in a paraxial region thereof and at least one convex critical point in an off-axis region of the image-side surface thereof.

28 Claims, 27 Drawing Sheets

(56) References Cited

U.S. PATENT DOCUMENTS

| | | | |
|---|---|---|---|
| 2015/0014515 A1 | 1/2015 | Lin et al. | |
| 2015/0085380 A1 | 3/2015 | Choi et al. | |
| 2015/0362702 A1* | 12/2015 | Tang | G02B 13/0045 359/713 |
| 2016/0131870 A1* | 5/2016 | Tang | G02B 13/0045 359/713 |
| 2016/0170181 A1 | 6/2016 | Chae | |
| 2017/0038557 A1 | 2/2017 | Chen et al. | |
| 2017/0227741 A1 | 8/2017 | Dai et al. | |

FOREIGN PATENT DOCUMENTS

| | | |
|---|---|---|
| JP | H11-295600 | 10/1999 |
| WO | 2016179986 A1 | 11/2016 |
| WO | 2019019669 A1 | 1/2019 |

* cited by examiner

OPTICAL IMAGE CAPTURING SYSTEM, IMAGING APPARATUS AND ELECTRONIC DEVICE

RELATED APPLICATIONS

This application claims priority to Taiwan Application Serial Number 106125880, filed on Aug. 1, 2017, which is incorporated by reference herein in its entirety.

BACKGROUND

Technical Field

The present disclosure relates to an optical image capturing system and an imaging apparatus, and more particularly, to an optical image capturing system and an imaging apparatus applicable to electronic devices.

Description of Related Art

With the developments in technology, electronic devices equipped with image capturing modules have become widely used and become indispensible in the applications, especially with image capturing modules of high image quality. Meanwhile, electronic devices are developed to have multifunction such that the needs of miniaturized image capturing modules grow increasingly. Also, the popularity of car electronics and drones helps to bring about the need of wide-angle image capturing modules.

Regarding the conventional wide-angle image capturing modules with five lens elements, the spacing and the refractive power of the five lens elements are not properly arranged such that the volume of the image capturing module cannot be reduced while maintaining the image quality.

SUMMARY

According to one aspect of the present disclosure, an optical image capturing system, includes five lens elements, the five lens elements being, in order from an object side to an image side: a first lens element; a second lens element having positive refractive power; a third lens element having positive refractive power; a fourth lens element; and a fifth lens element having an image-side surface being concave in a paraxial region thereof and at least one convex critical point in an off-axis region of the image-side surface thereof, wherein an axial distance between the first lens element and the second lens element is T12, an axial distance between the fourth lens element and the fifth lens element is T45, an Abbe number of the second lens element is V2, an Abbe number of the fourth lens element is V4, a focal length of the third lens element is f3, a focal length of the fourth lens element is f4, and the following conditions are satisfied:

$0 \le T12/T45 < 0.40;$ $1.2 < V2/V4 < 9.0;$ $|f3/f4| < 1.50.$

According to another aspect of the present disclosure, an optical image capturing system, includes five lens elements, the five lens elements being, in order from an object side to an image side: a first lens element; a second lens element having positive refractive power; a third lens element having positive refractive power; a fourth lens element; and a fifth lens element having an image-side surface being concave in a paraxial region thereof and at least one convex critical point in an off-axis region of the image-side surface thereof, wherein an axial distance between the first lens element and the second lens element is T12, an axial distance between the fourth lens element and the fifth lens element is T45, an Abbe number of the second lens element is V2, an Abbe number of the fourth lens element is V4, a focal length of the optical image capturing system is f, a curvature radius of an object-side surface of the first lens element is R1, and the following conditions are satisfied:

$0 \le T12/T45 < 2.40;$ $1.2 < V2/V4 < 9.0;$ $f/R1 \le 0.$

According to another aspect of the present disclosure, an imaging apparatus includes the aforementioned optical image capturing system and an image sensor disposed on an image surface of the optical image capturing system.

According to another aspect of the present disclosure, an electronic device includes the aforementioned imaging apparatus.

According to another aspect of the present disclosure, an optical image capturing system, includes five lens elements, the five lens elements being, in order from an object side to an image side: a first lens element; a second lens element having positive refractive power; a third lens element having positive refractive power; a fourth lens element having negative refractive power; and a fifth lens element having an image-side surface being concave in a paraxial region thereof and at least one convex critical point in an off-axis region of the image-side surface thereof, wherein an axial distance between the first lens element and the second lens element is T12, an axial distance between the fourth lens element and the fifth lens element is T45, a focal length of the optical image capturing system is f, a curvature radius of an object-side surface of the first lens element is R1, and the following conditions are satisfied:

$0 \le T12/T45 < 0.90;$ $f/R1 \le 0.$

DETAILED DESCRIPTION

Figure 1A:
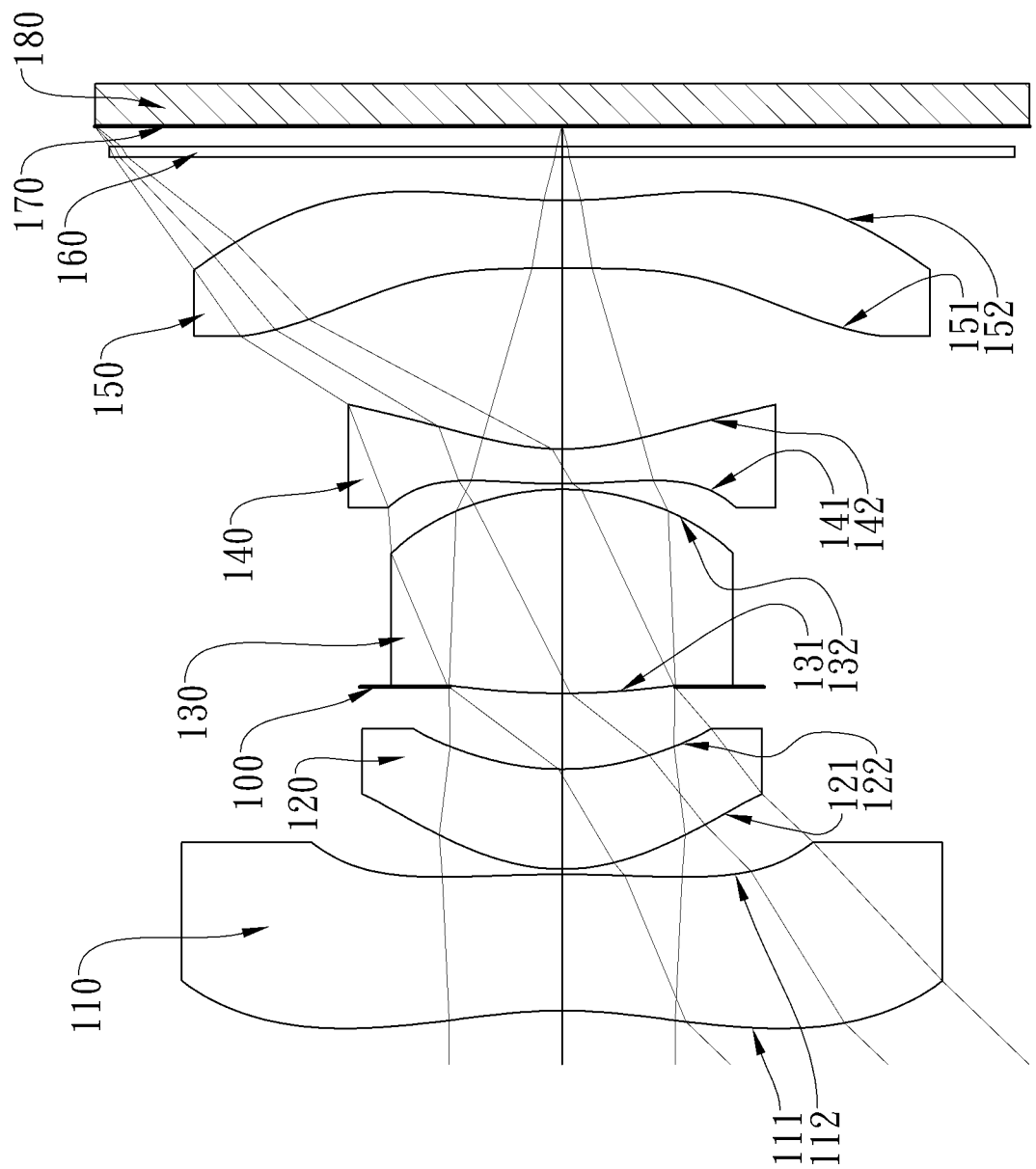
FIG. 1A is a schematic view of an imaging apparatus according to the 1st embodiment of the present disclosure.

The present disclosure provides an optical image capturing system including five lens elements, the five lens elements being, in order from an object side to an image side, a first lens element, a second lens element, a third lens element, a fourth lens element, and a fifth lens element.

The first lens element may have negative refractive power to reduce the incident angle of light at wide field of view onto the second lens element so as to favorably form a structure for wide angle of view. The first lens element may have at least one convex critical point in an off-axis region of an object-side surface thereof to reduce surface reflections of peripheral light so as to increase illuminations on an image surface and favorably form a structure for wide angle of view.

The second lens element with positive refractive power may provide light converging capability to the optical image capturing system and reduce a total track length. The second lens element may have an object-side surface being convex in a paraxial region thereof to reduce the incident angle of peripheral light so as to reduce surface reflections. The second lens element may have an image-side surface being concave in a paraxial region thereof to reduce field curvature and favorably reduce the total track length.

The third lens element with positive refractive power can share a part of the overall positive refractive power of the optical image capturing system for reducing the total track length and the sensitivity.

The fourth lens element may have negative refractive power to balance spherical aberrations and chromatic aberrations resulted from the second lens element and the third lens element. The fourth lens element may have an image-side surface being concave in a paraxial region thereof to favorably correct astigmatisms.

The fifth lens element may have negative refractive power to correct Petzval sum, making the image surface even flat and further enhance the correction of astigmatisms to obtain an increased sharpness of the image. The fifth lens element has an image-side surface being concave in a paraxial region thereof to reduce a back focal length so as to reduce the total track length and the incident angle of peripheral light onto the image surface. The fifth lens element has at least one convex critical point on the image-side surface thereof to correct aberrations in an off-axis region and reduce surface reflections of peripheral light so as to increase peripheral illuminations on the image surface.

The optical image capturing system may further include an aperture stop. The aperture stop may be located between the second lens element and the third lens element such that the position of the aperture stop is configured for enlarging field of view and reducing the volume of the optical image capturing system.

When an axial distance between the first lens element and the second lens element is T12, an axial distance between the fourth lens element and the fifth lens element is T45, and the following condition can be satisfied: $0 \leq T12/T45 < 2.40$, the spacing between the lens elements and can be adjusted into a suitable ratio so as to correct aberrations in an off-axis region and form a structure for wide angle of view. Preferably, the following condition can be satisfied: $0 \leq T12/T45 < 0.90$. Preferably, the following condition can be satisfied: $0 \leq T12/T45 < 0.40$. Preferably, the following condition can be satisfied: $0 \leq T12/T45 < 0.20$.

When an Abbe number of the second lens element is V2, an Abbe number of the fourth lens element is V4, and the following conditions can be satisfied: $1.2 < V2/V4 < 9.0$, the second lens element and the fourth lens element can function cooperatively with each other to reduce chromatic aberrations so as to reduce an occurrence of color shifts. Preferably, the following condition can be satisfied: $1.7 < V2/V4 < 6.0$. Preferably, the following condition can be satisfied: $2.3 < V2/V4 < 4.0$.

When a focal length of the third lens element is f3, a focal length of the fourth lens element is f4, and the following condition can be satisfied: $|f3/f4| < 1.50$, the refractive power ratio of the third lens element and the fourth lens element can be arranged so as to reduce the total track length and correct spherical aberrations and chromatic aberrations.

When a focal length of the optical image capturing system is f, a curvature radius of the object-side surface of the first lens element is R1, and the following condition can be satisfied: $f/R1 \leq 0$, the shape of the first lens element and the focal length of the optical image capturing system can be adjusted such that the optical image capturing system can be suitably designed for wide angle of view.

When a central thickness of the third lens element is CT3, a central thickness of the fourth lens element is CT4, and the following condition can be satisfied: 1.5<CT3/CT4<7.0, the third lens element and the fourth lens element can function cooperatively with each other so as to correct chromatic aberrations.

When a central thickness of the fifth lens element is CT5, the axial distance between the fourth lens element and the fifth lens element is T45, and the following condition can be satisfied: 0.10<CT5/T45<7.0, the aberrations in an off-axis region can be favorably corrected and peripheral illuminations on the image surface can be increased. Preferably, the following condition can be satisfied: 0.15<CT5/T45<3.2. Preferably, the following condition can be satisfied: 0.20<CT5/T45<1.5.

When the focal length of the optical image capturing system is f, the focal length of the fourth lens element is f4, and the following condition can satisfied: 0.25<|f/f4|<0.90, chromatic aberrations can be further corrected and the area of the image surface can be favorably increased.

When a vertical distance between a maximum effective diameter position on the object-side surface of the first lens element and an optical axis is Y11, a vertical distance between a maximum effective diameter position on the image-side surface of the fifth lens element and the optical axis is Y52, and the following conditions can be satisfied: 0.60<Y11/Y52<1.50, the volume can still be maintained while enlarging the field of view. Preferably, the following condition can be satisfied: 0.80<Y11/Y52<1.30.

When the axial distance between the first lens element and the second lens element is T12, an axial distance between the second lens element and the third lens element is T23, and the following condition can be satisfied: 0≤T12/T23<1.35, the spacing between the first lens element and the third lens element can be adjusted for correcting aberrations in an off-axis region.

When a curvature radius of the image-side surface of the fifth lens element is R10, the focal length of the optical image capturing system is f, and the following condition can be satisfied: 0<R10/f<1.6, balances between compressing a back focal length and enlarging field of view can be obtained.

When a focal length of the second lens element is f2, the focal length of the third lens element is f3, the focal length of the fourth lens element is f4, and the following condition can be satisfied: 2.0<|f4/f2|+|f4/f3|, a sufficient positive refractive power can be obtained so as to shorten the total track length and spherical aberrations resulted from the shortened total track length can be corrected.

When a curvature radius of the object-side surface of the second lens element is R3, the focal length of the optical image capturing system is f, and the following condition can be satisfied: 0.10<R3/f<0.77, shape of second lens element can be adjusted for correcting aberrations in an off-axis region.

When the focal length of the optical image capturing system is f, a curvature radius of an image-side surface of the first lens element is R2, and the following condition can be satisfied: f/R2≤0, shape of the first lens element can be adjusted to function cooperatively with the second lens element so as to correct aberrations in an off-axis region.

When an axial distance between the object-side surface of the first lens element and the image surface is TL, a maximum image height of the optical image capturing system is ImgH, and the following condition can be satisfied: 1.0<TL/ImgH<3.0, balances between reducing the total track length and increasing the area of the image surface can be obtained.

According to the optical image capturing system of the present disclosure, the definition of the critical point is a point on the surface of the lens element where the tangential plane of the point is perpendicular to the optical axis.

According to the optical image capturing system of the present disclosure, the lens elements thereof can be made of glass or plastic material. When the lens elements are made of glass material, the distribution of the refractive power of the optical image capturing system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the optical image capturing system can be effectively reduced.

According to the optical image capturing system of the present disclosure, the optical image capturing system can include at least one stop, such as an aperture stop, a glare stop or a field stop, so as to favorably reduce the amount of stray light and thereby improving the image quality.

According to the optical image capturing system of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the optical image capturing system with the advantage of a wide-angle lens.

According to the optical image capturing system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical image capturing system of the present disclosure, the image surface of the optical image capturing system, based on the corresponding image sensor, can be a plane or a curved surface with an arbitrary curvature, especially a curved surface being concave facing towards the object side. Meanwhile, the optical image capturing system of the present disclosure may optionally include one or more image correction components (such as a field flattener) between the image surface and the most nearing lens element to the image surface so as to achieve the effect of image correction (such as the field curvature). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. In general, a preferred image correction component may be a thin plano-concave component having a surface being concave toward the object side and be arranged near to the image surface.

According to the above description of the present disclosure, the following 1st-12th specific embodiments are provided for further explanation.

1st Embodiment

Figure 1B:
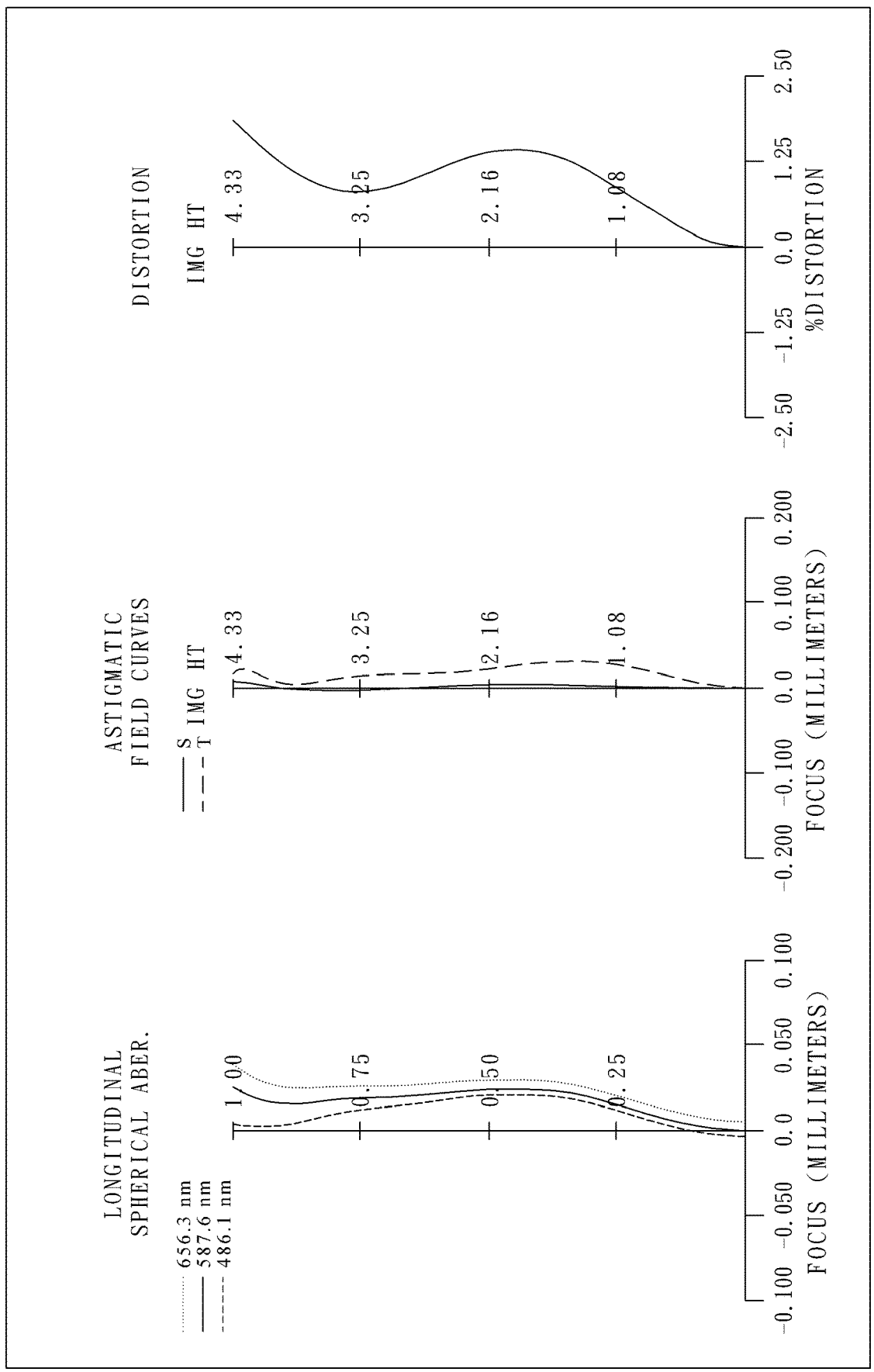
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an optical image capturing system (not otherwise herein labeled) of the present disclosure and an image sensor 180. The optical image capturing system includes five lens elements, the five lens elements being, in order from an object side to an image side, a first lens element 110, a second lens element 120, a third lens element 130, a fourth lens element 140, and a fifth lens element 150 and no other lens elements being inserted between the first lens element 110 and the fifth lens element 150.

The first lens element 110 with negative refractive power has an object-side surface 111 being concave in a paraxial region thereof, an image-side surface 112 being convex in a paraxial region thereof, both the object-side surface 111 and the image-side surface 112 being aspheric, and at least one convex critical point in an off-axis region of the object-side surface 111 thereof. The first lens element 110 is made of plastic material.

The second lens element 120 with positive refractive power has an object-side surface 121 being convex in a paraxial region thereof, an image-side surface 122 being concave in a paraxial region thereof, and both the object-side surface 121 and the image-side surface 122 being aspheric. The second lens element 120 is made of plastic material.

The third lens element 130 with positive refractive power has an object-side surface 131 being convex in a paraxial region thereof, an image-side surface 132 being convex in a paraxial region thereof, and both the object-side surface 131 and the image-side surface 132 being aspheric. The third lens element 130 is made of glass material.

The fourth lens element 140 with negative refractive power has an object-side surface 141 being convex in a paraxial region thereof, an image-side surface 142 being concave in a paraxial region thereof, and both the object-side surface 141 and the image-side surface 142 being aspheric. The fourth lens element 140 is made of plastic material.

The fifth lens element 150 with negative refractive power has an object-side surface 151 being concave in a paraxial region thereof, an image-side surface 152 being concave in a paraxial region thereof, both the object-side surface 151 and the image-side surface 152 being aspheric, and at least one convex critical point in an off-axis region of the image-side surface 152 thereof. The fifth lens element 150 is made of plastic material.

The optical image capturing system further includes an aperture stop 100 located between the second lens element 120 and the third lens element 130, and an IR cut filter 160 located between the fifth lens element 150 and an image surface 170. The IR cut filter 160 is made of glass material and will not affect the focal length of the optical image capturing system. The image sensor 180 is disposed on or near the image surface 170 of the optical image capturing system.

Figure 11:
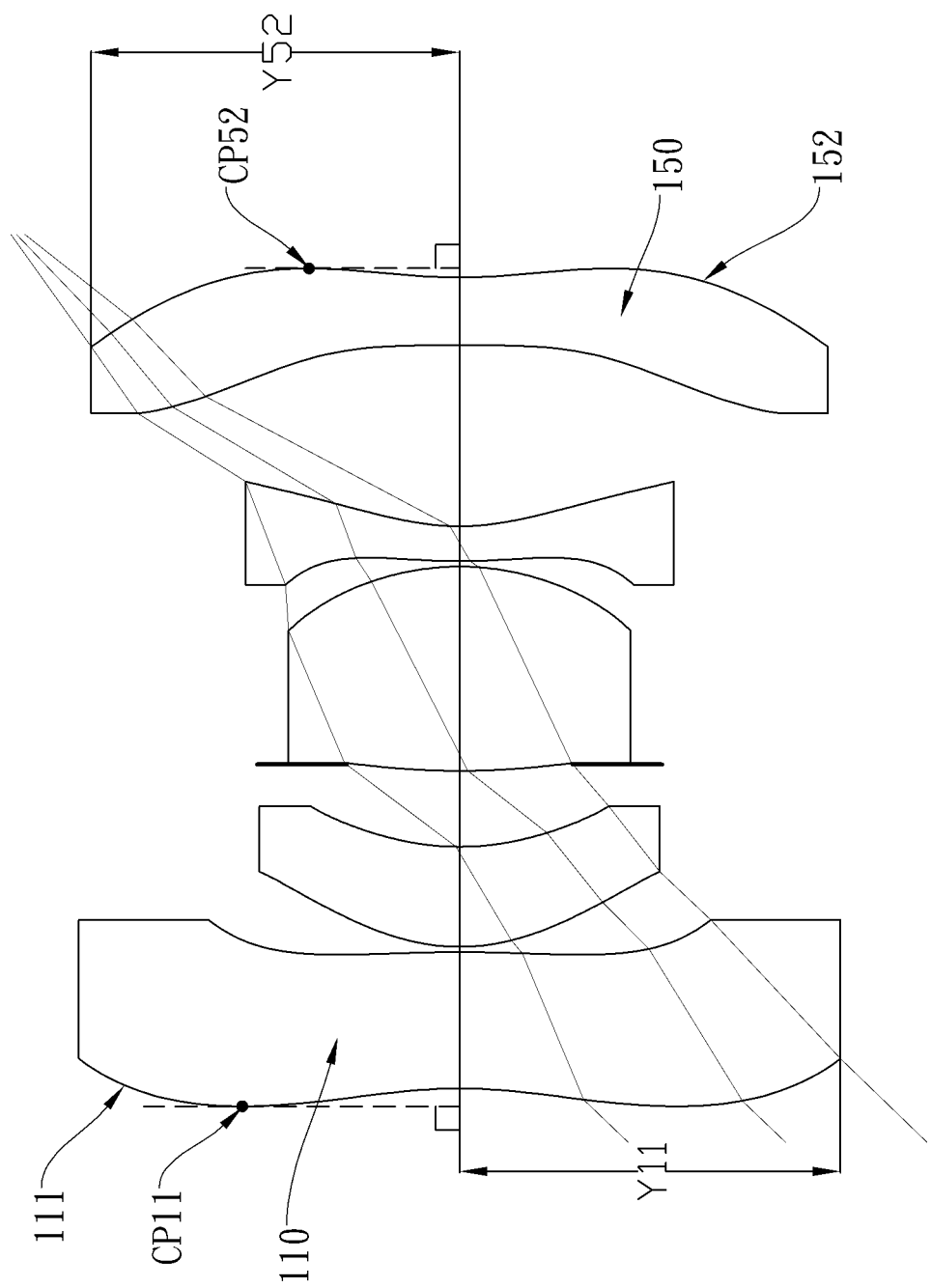
FIG. 11 is a schematic view showing critical points CP11, CP52 and parameters Y11, Y52 of the 1st embodiment of the present disclosure as an example.

Please refer to FIG. 11, which is a schematic view showing critical points CP11, CP52 and parameters Y11, Y52 of the 1st embodiment of the present disclosure as an example. Please note the definitions of these characters exemplarily shown in FIG. 11 are also applicable to any of other embodiments of the imaging apparatus of the present disclosure. The first lens element 110 has the at least one convex critical point CP11 in the off-axis region of the object-side surface 111 thereof. The fifth lens element 150 has the at least one convex critical point CP52 in the off-axis region of the image-side surface 152 thereof. A vertical distance between a maximum effective diameter position on the object-side surface 111 of the first lens element 110 and an optical axis is Y11. A vertical distance between a maximum effective diameter position on the image-side surface 152 of the fifth lens element 150 and the optical axis is Y52.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view, and surfaces #1 to #14 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 4.08 mm, Fno = 1.95, HFOV = 46.0 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −4.407 | ASP | 1.262 | Plastic | 1.614 | 26.0 | −11.58 |
| 2 | | −12.861 | ASP | 0.050 | | | | |
| 3 | Lens 2 | 1.846 | ASP | 0.927 | Plastic | 1.544 | 56.0 | 9.18 |
| 4 | | 2.411 | ASP | 0.764 | | | | |
| 5 | Ape. Stop | Planar | | −0.061 | | | | |
| 6 | Lens 3 | 6.892 | ASP | 1.893 | Glass | 1.755 | 45.6 | 2.62 |
| 7 | | −2.449 | ASP | 0.050 | | | | |
| 8 | Lens 4 | 5.093 | ASP | 0.324 | Plastic | 1.669 | 19.5 | −5.87 |
| 9 | | 2.161 | ASP | 1.676 | | | | |

TABLE 1-continued (1st Embodiment)
f = 4.08 mm, Fno = 1.95, HFOV = 46.0 deg.

| Surface # | | Curvature Radius | Thickness | Material | Index | Abbe # | Focal Length |
|---|---|---|---|---|---|---|---|
| 10 | Lens 5 | −154.325 ASP | 0.630 | Plastic | 1.650 | 21.8 | −7.44 |
| 11 | | 4.996 ASP | 0.400 | | | | |
| 12 | IR Cut Filter | Planar | 0.100 | Glass | 1.517 | 64.2 | — |
| 13 | | Planar | 0.187 | | | | |
| 14 | Image Surface | Planar | — | | | | |

* Reference wavelength is d-line 587.6 nm.

TABLE 2

| Aspheric Coefficients | | | | | |
|---|---|---|---|---|---|
| Surface # | 1 | 2 | 3 | 4 | 6 |
| k = | −2.1131E+01 | −8.3079E+01 | −2.3408E+00 | 4.7870E−01 | −7.0817E+00 |
| A4 = | 9.7364E−03 | 1.2162E−02 | 2.2375E−03 | −2.6950E−02 | −1.3779E−03 |
| A6 = | −1.0869E−03 | 6.4491E−04 | 2.3197E−03 | 1.6575E−03 | 7.0056E−03 |
| A8 = | 1.2662E−04 | −4.8983E−04 | −3.8270E−03 | −2.5148E−03 | −1.6943E−02 |
| A10 = | −7.8234E−06 | 1.6865E−04 | 1.4059E−03 | 1.4691E−03 | 1.3346E−02 |
| A12 = | 2.0494E−07 | −1.5000E−05 | −1.8120E−04 | | −4.4474E−03 |

| Surface # | 7 | 8 | 9 | 10 | 11 |
|---|---|---|---|---|---|
| k = | 1.2522E−01 | −7.1993E+01 | −9.2092E+00 | 9.0000E+01 | −9.3978E+00 |
| A4 = | 8.7958E−03 | −3.4811E−02 | 1.2427E−03 | −4.4531E−02 | −3.0467E−02 |
| A6 = | −8.6777E−04 | −3.7712E−03 | −5.0544E−03 | 7.2266E−03 | 4.9427E−03 |
| A8 = | −4.0561E−03 | −1.7469E−03 | 1.1806E−03 | −4.6425E−03 | −6.3803E−04 |
| A10 = | 2.1419E−03 | 4.7651E−05 | 6.1356E−05 | −1.0565E−04 | 5.1127E−05 |
| A12 = | −3.8543E−04 | 1.7402E−04 | −4.8647E−05 | 1.2587E−05 | −1.5842E−06 |
| A14 = | | −3.9040E−05 | 4.5274E−06 | −5.9431E−07 | −5.2469E−08 |
| A16 = | | | | 1.0023E−08 | 3.5958E−09 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical image capturing system is f, an f-number of the optical image capturing system is Fno, a half of a maximal field of view of the optical image capturing system is HFOV, and these parameters have the following values: f=4.08 mm; Fno=1.95; and HFOV=46.0 degrees.

In the 1st embodiment, an Abbe number of the second lens element 120 is V2, an Abbe number of the fourth lens element 140 is V4, and they satisfy the condition: V2/V4=2.88.

In the 1st embodiment, a central thickness of the third lens element 130 is CT3, a central thickness of the fourth lens element 140 is CT4, and they satisfy the condition: CT3/CT4=5.84.

In the 1st embodiment, a central thickness of the fifth lens element 150 is CT5, an axial distance between the fourth lens element 140 and the fifth lens element 150 is T45, and they satisfy the condition: CT5/T45=0.38.

In the 1st embodiment, an axial distance between the first lens element 110 and the second lens element 120 is T12, an axial distance between the second lens element 120 and the third lens element 130 is T23, and they satisfy the condition: T12/T23=0.07.

In the 1st embodiment, the axial distance between the first lens element 110 and the second lens element 120 is T12, the axial distance between the fourth lens element 140 and the fifth lens element 150 is T45, and they satisfy the condition: T12/T45=0.03.

In the 1st embodiment, a curvature radius of the object-side surface 121 of the second lens element 120 is R3, the focal length of the optical image capturing system is f, and they satisfy the condition: R3/f=0.45.

In the 1st embodiment, a curvature radius of the image-side surface 152 of the fifth lens element 150 is R10, the focal length of the optical image capturing system is f, and they satisfy the condition: R10/f=1.22.

In the 1st embodiment, the focal length of the optical image capturing system is f, a curvature radius of the object-side surface 111 of the first lens element 110 is R1, and they satisfy the condition: f/R1=−0.93.

In the 1st embodiment, the focal length of the optical image capturing system is f, a curvature radius of the image-side surface 112 of the first lens element 110 is R2, and they satisfy the condition: f/R2=−0.32.

In the 1st embodiment, the focal length of the optical image capturing system is f, a focal length of the fourth lens element 140 is f4, and they satisfy the condition: |f/f4|=0.70.

In the 1st embodiment, a focal length of the third lens element 130 is f3, the focal length of the fourth lens element 140 is f4, and they satisfy the condition: |f3/f4|=0.45.

In the 1st embodiment, a focal length of the second lens element 120 is f2, the focal length of the third lens element 130 is f3, the focal length of the fourth lens element 140 is f4, and they satisfy the condition: |f4/f2|+|f4/f3|=2.88.

In the 1st embodiment, an axial distance between the object-side surface 111 of the first lens element 110 and the image surface 170 is TL, a maximum image height of the optical image capturing system is ImgH, and they satisfy the condition: TL/ImgH=1.89.

In the 1st embodiment, the vertical distance between the maximum effective diameter position on the object-side surface 111 of the first lens element 110 and the optical axis is Y11, the vertical distance between the maximum effective diameter position on the image-side surface 152 of the fifth lens element 150 and the optical axis is Y52, and they satisfy the condition: Y11/Y52=1.03.

2nd Embodiment

Figure 2A:
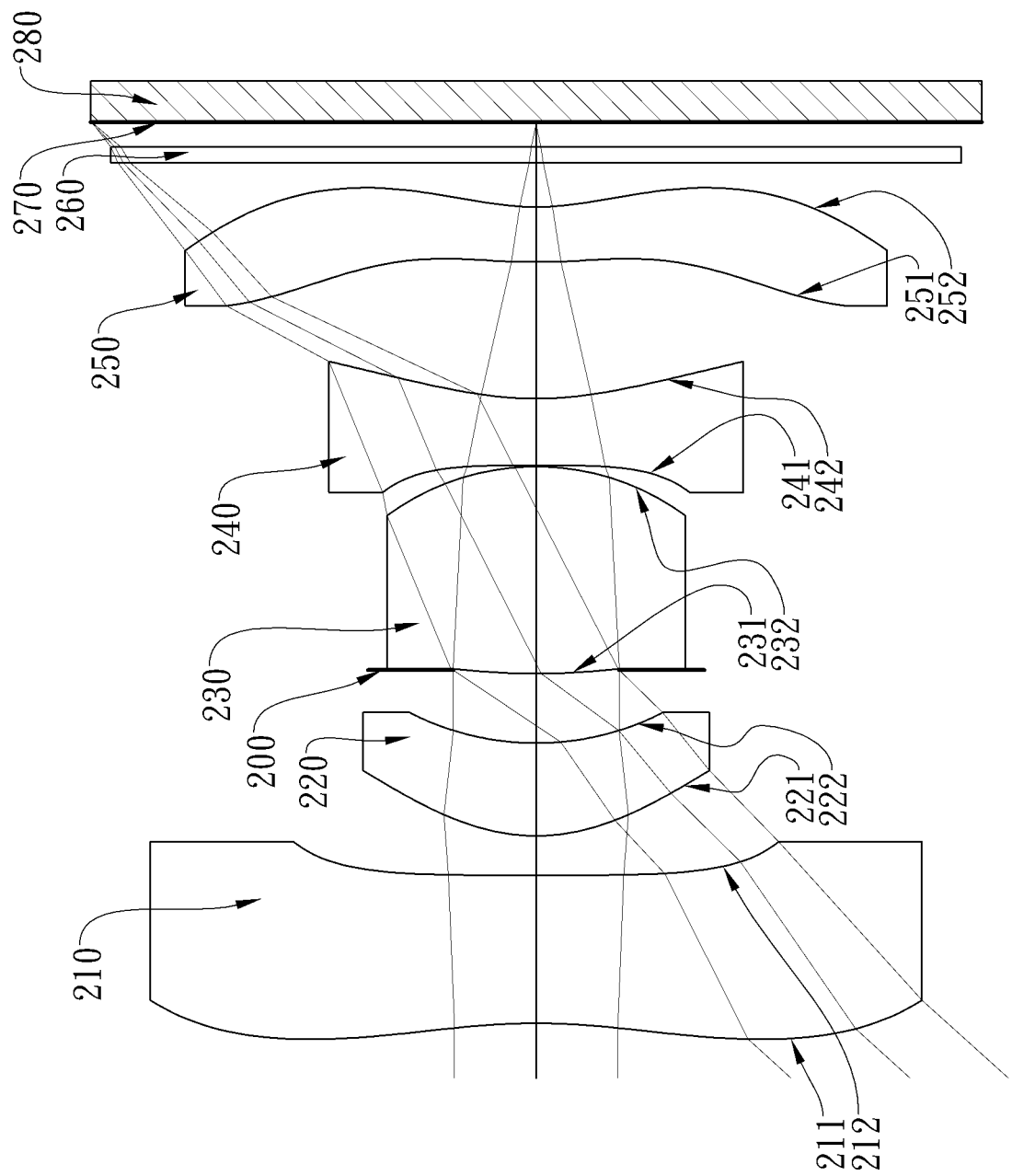
FIG. 2A is a schematic view of an imaging apparatus according to the 2nd embodiment of the present disclosure.
Figure 2B:
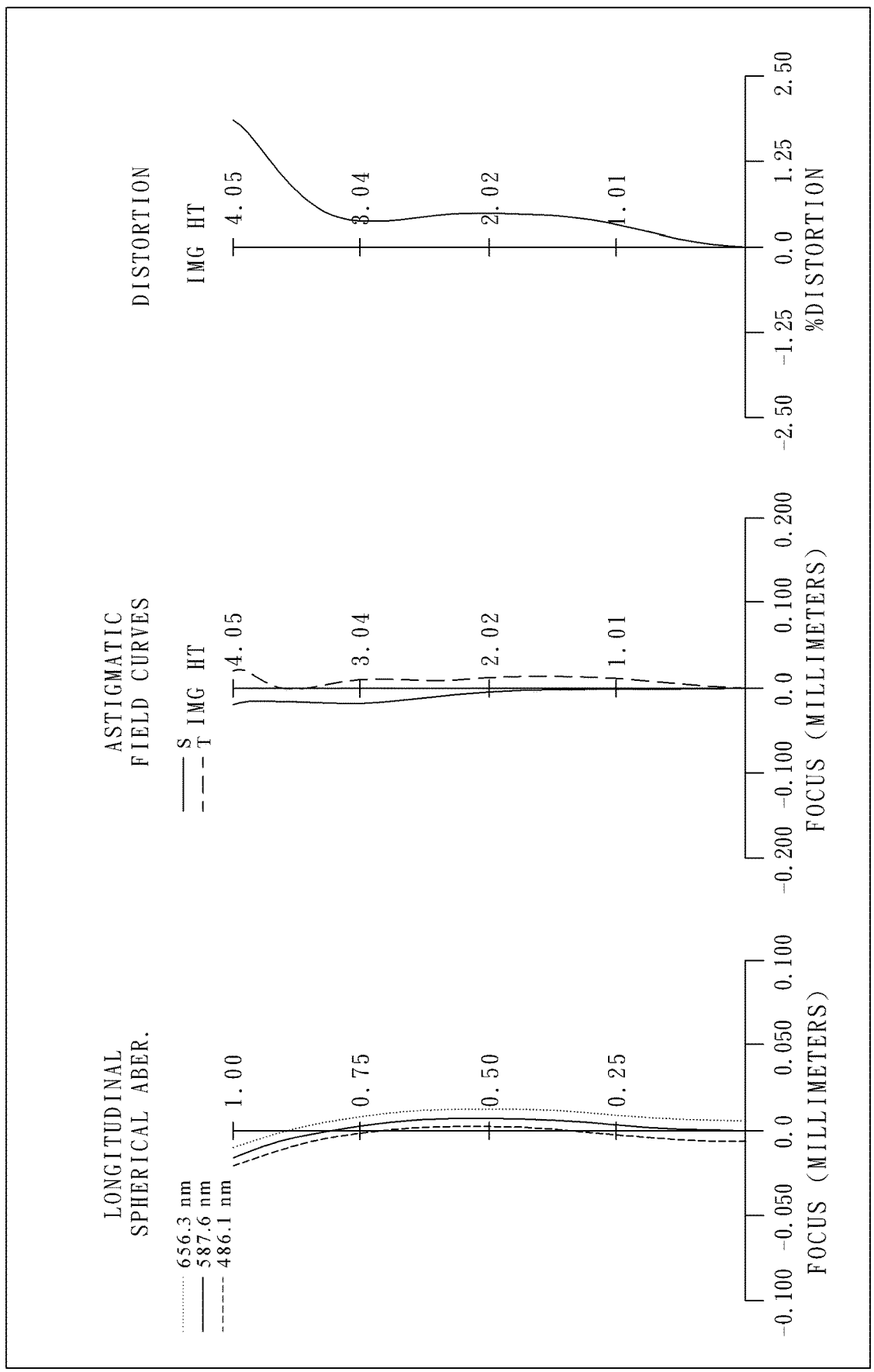
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an optical image capturing system (not otherwise herein labeled) of the present disclosure and an image sensor 280. The optical image capturing system includes five lens elements, the five lens elements being, in order from an object side to an image side, a first lens element 210, a second lens element 220, a third lens element 230, a fourth lens element 240, and a fifth lens element 250 and no other lens elements being inserted between the first lens element 210 and the fifth lens element 250.

The first lens element 210 with negative refractive power has an object-side surface 211 being concave in a paraxial region thereof, an image-side surface 212 being concave in a paraxial region thereof, both the object-side surface 211 and the image-side surface 212 being aspheric, and at least one convex critical point in an off-axis region of the object-side surface 211 thereof. The first lens element 210 is made of plastic material.

The second lens element 220 with positive refractive power has an object-side surface 221 being convex in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, and an image-side surface 232 being convex in a paraxial region thereof. The third lens element 230 is made of glass material.

The fourth lens element 240 with negative refractive power has an object-side surface 241 being concave in a paraxial region thereof, an image-side surface 242 being concave in a paraxial region thereof, and both the object-side surface 241 and the image-side surface 242 being aspheric. The fourth lens element 240 is made of plastic material.

The fifth lens element 250 with negative refractive power has an object-side surface 251 being convex in a paraxial region thereof, an image-side surface 252 being concave in a paraxial region thereof, both the object-side surface 251 and the image-side surface 252 being aspheric, and at least one convex critical point in an off-axis region of the image-side surface 252 thereof. The fifth lens element 250 is made of plastic material.

The optical image capturing system further includes an aperture stop 200 located between the second lens element 220 and the third lens element 230, and an IR cut filter 260 located between the fifth lens element 250 and an image surface 270. The IR cut filter 260 is made of glass material and will not affect the focal length of the optical image capturing system. The image sensor 280 is disposed on or near the image surface 270 of the optical image capturing system.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

| (2nd Embodiment) f = 3.58 mm, Fno = 2.41, HFOV = 47.9 deg. | | | | | | | |
|---|---|---|---|---|---|---|---|
| Surface # | | Curvature Radius | Thickness | Material | Index | Abbe # | Focal Length |
| 0 | Object | Planar | Infinity | | | | |
| 1 | Lens 1 | −5.393 ASP | 1.345 | Plastic | 1.614 | 26.0 | −8.54 |
| 2 | | 201.207 ASP | 0.360 | | | | |
| 3 | Lens 2 | 1.737 ASP | 0.844 | Plastic | 1.566 | 37.4 | 7.36 |
| 4 | | 2.457 ASP | 0.666 | | | | |
| 5 | Ape. Stop | Planar | −0.033 | | | | |
| 6 | Lens 3 | 6.406 | 1.885 | Glass | 1.804 | 46.5 | 2.32 |
| 7 | | −2.286 | 0.010 | | | | |
| 8 | Lens 4 | −163.934 ASP | 0.609 | Plastic | 1.660 | 20.4 | −4.62 |
| 9 | | 3.114 ASP | 1.243 | | | | |
| 10 | Lens 5 | 5.091 ASP | 0.503 | Plastic | 1.660 | 20.4 | −7.57 |
| 11 | | 2.423 ASP | 0.400 | | | | |

TABLE 3-continued (2nd Embodiment)
f = 3.58 mm, Fno = 2.41, HFOV = 47.9 deg.

| Surface # | | Curvature Radius | Thickness | Material | Index | Abbe # | Focal Length |
|---|---|---|---|---|---|---|---|
| 12 | IR Cut Filter | Planar | 0.145 | Glass | 1.517 | 64.2 | — |
| 13 | | Planar | 0.228 | | | | |
| 14 | Image Surface | Planar | — | | | | |

\* Reference wavelength is d-line 587.6 nm.

TABLE 4

| Aspheric Coefficients | | | | |
|---|---|---|---|---|
| Surface # | 1 | 2 | 3 | 4 |
| k = | −2.4614E+01 | −9.0000E+01 | −2.0409E+00 | 8.4856E−01 |
| A4 = | 8.1099E−03 | 6.7059E−03 | 6.2205E−03 | −1.0310E−02 |
| A6 = | −8.0225E−04 | 8.1041E−04 | −1.6868E−03 | −1.3720E−02 |
| A8 = | 8.0980E−05 | −1.0995E−04 | −3.8692E−03 | 1.1055E−02 |
| A10 = | −4.2189E−06 | 3.6445E−05 | 2.4220E−03 | −2.2982E−03 |
| A12 = | 9.7078E−08 | 2.2626E−07 | −4.4186E−04 | |
| Surface # | 8 | 9 | 10 | 11 |
| k = | −9.0000E+01 | −9.7568E+00 | −4.8252E+01 | −9.8415E+00 |
| A4 = | −5.7187E−02 | −1.6621E−03 | −5.9120E−02 | −3.8826E−02 |
| A6 = | 3.2243E−03 | −2.8624E−03 | 1.3773E−02 | 8.9843E−03 |
| A8 = | −5.4022E−03 | 1.8247E−03 | −1.7397E−03 | −1.6696E−03 |
| A10 = | 2.9507E−03 | −5.5364E−04 | 1.3894E−04 | 2.1402E−04 |
| A12 = | −1.3274E−03 | 8.9971E−05 | −6.3341E−06 | −1.7913E−05 |
| A14 = | 2.0811E−04 | −6.1779E−06 | 1.1488E−07 | 8.7937E−07 |
| A16 = | | | 4.0110E−10 | −1.8875E−08 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 3.58 | R10/f | 0.68 |
| Fno | 2.41 | f/R1 | −0.66 |
| HFOV [deg.] | 47.9 | f/R2 | 0.02 |
| V2/V4 | 1.84 | \|f/f4\| | 0.78 |
| CT3/CT4 | 3.10 | \|f3/f4\| | 0.50 |
| CT5/CT45 | 0.40 | \|f4/f2\| + \|f4/f3\| | 2.62 |
| T12/T23 | 0.57 | TL/ImgH | 2.03 |
| T12/T45 | 0.29 | Y11/Y52 | 1.10 |
| R3/f | 0.48 | | |

Figure 3A:
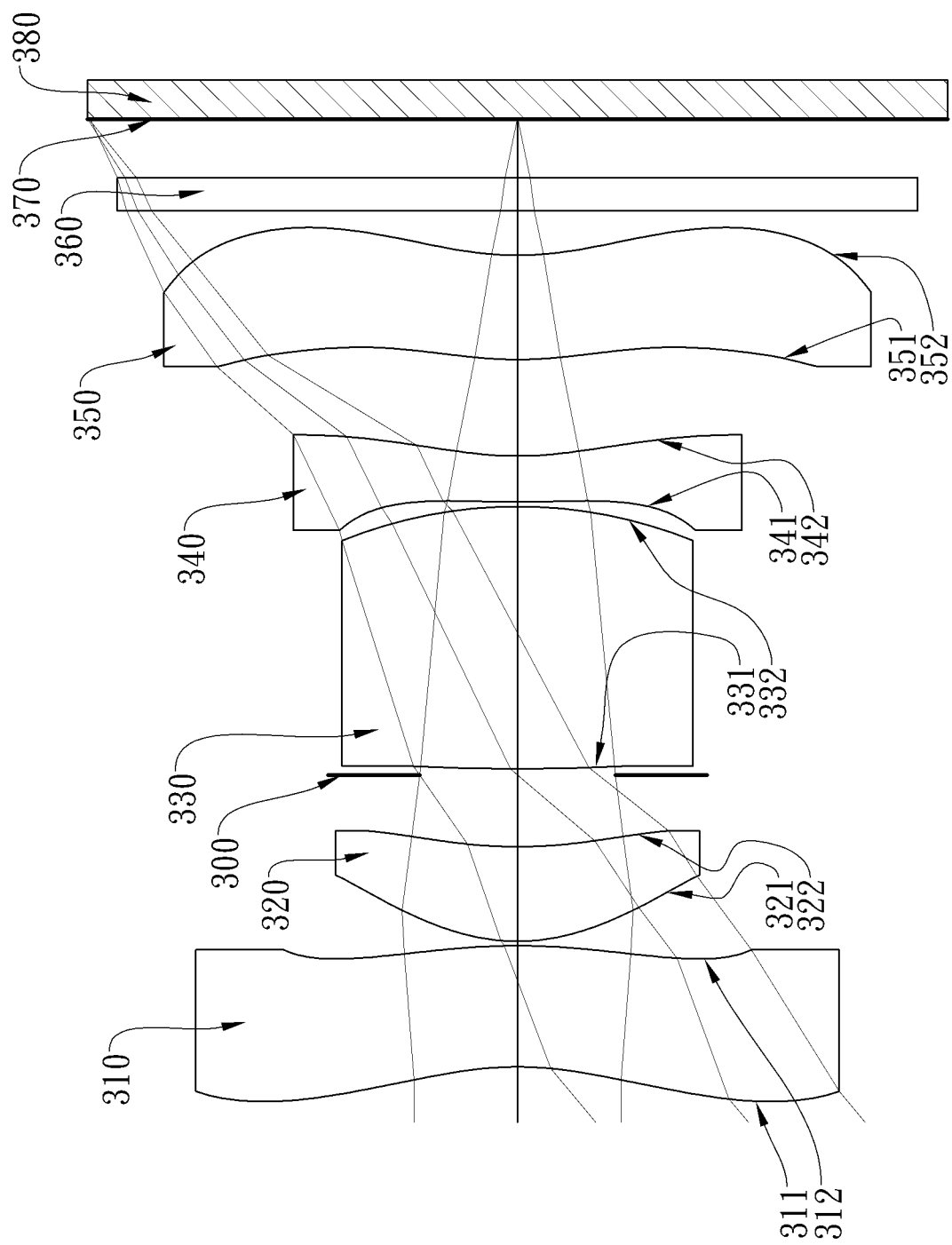
FIG. 3A is a schematic view of an imaging apparatus according to the 3rd embodiment of the present disclosure.
Figure 3B:
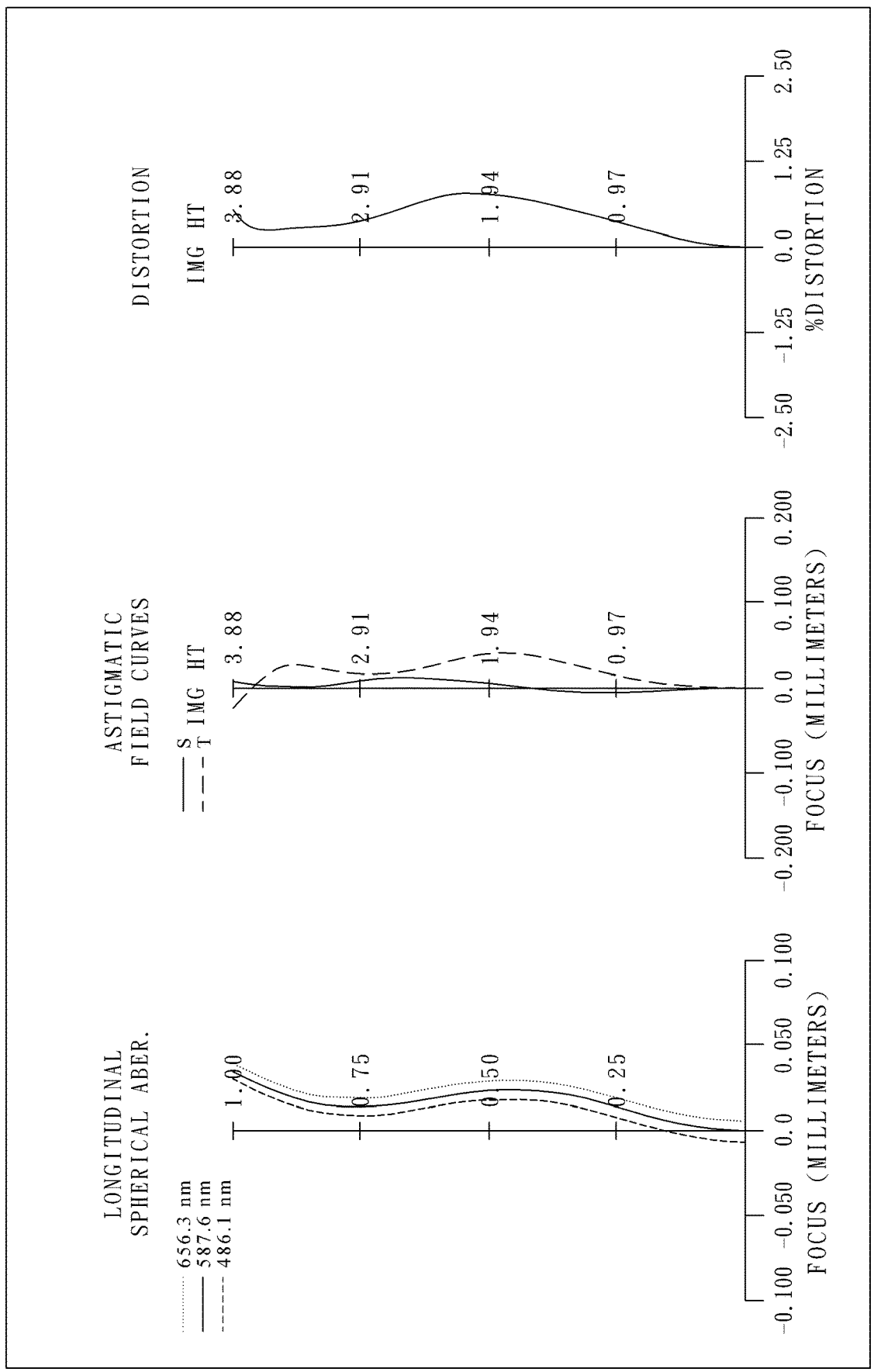
FIG. 3B shows longitudinal spherical aberration curves, astigmatic field curves and a distortion curve of the imaging apparatus according to the 3rd embodiment.

3rd Embodiment FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an optical image capturing system (not otherwise herein labeled) of the present disclosure and an image sensor 380. The optical image capturing system includes five lens elements, the five lens elements being, in order from an object side to an image side, a first lens element 310, a second lens element 320, a third lens element 330, a fourth lens element 340, and a fifth lens element 350 and no other lens elements being inserted between the first lens element 310 and the fifth lens element 350.

The first lens element 310 with negative refractive power has an object-side surface 311 being concave in a paraxial region thereof, an image-side surface 312 being convex in a paraxial region thereof, both the object-side surface 311 and the image-side surface 312 being aspheric, and at least one convex critical point in an off-axis region of the object-side surface 311 thereof. The first lens element 310 is made of plastic material.

The second lens element 320 with positive refractive power has an object-side surface 321 being convex in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, and an image-side surface 332 being convex in a paraxial region thereof. The third lens element 330 is made of glass material.

The fourth lens element 340 with negative refractive power has an object-side surface 341 being convex in a paraxial region thereof, an image-side surface 342 being concave in a paraxial region thereof, and both the object-side surface 341 and the image-side surface 342 being aspheric. The fourth lens element 340 is made of plastic material.

The fifth lens element 350 with negative refractive power has an object-side surface 351 being convex in a paraxial region thereof, an image-side surface 352 being concave in a paraxial region thereof, both the object-side surface 351 and the image-side surface 352 being aspheric, and at least one convex critical point in an off-axis region of the image-side surface 352 thereof. The fifth lens element 350 is made of plastic material.

The optical image capturing system further includes an aperture stop 300 located between the second lens element 320 and the third lens element 330, and an IR cut filter 360 located between the fifth lens element 350 and an image surface 370. The IR cut filter 370 is made of glass material and will not affect the focal length of the optical image capturing system. The image sensor 380 is disposed on or near the image surface 370 of the optical image capturing system.

The detailed optical data of the 3rd embodiment are shown in TABLE 5, and the aspheric surface data are shown in TABLE 6, wherein the units of the curvature radius, the thickness and the focal length are expressed in mm, and HFOV is a half of the maximal field of view.

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 4.58 | R10/f | 0.59 |
| Fno | 2.45 | f/R1 | −1.57 |
| HFOV [deg.] | 40.0 | f/R2 | −0.81 |
| V2/V4 | 2.75 | $|f/f4|$ | 0.71 |
| CT3/CT4 | 5.71 | $|f3/f4|$ | 0.74 |
| CT5/T45 | 1.08 | $|f4/f2| + |f4/f3|$ | 2.63 |
| T12/T23 | 0.06 | TL/ImgH | 2.21 |

TABLE 5

(3rd Embodiment)
f = 4.58 mm, Fno = 2.45, HFOV = 40.0 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −2.915 | ASP | 1.093 | Plastic | 1.614 | 26.0 | −11.50 |
| 2 | | −5.674 | ASP | 0.040 | | | | |
| 3 | Lens 2 | 1.760 | ASP | 0.853 | Plastic | 1.544 | 56.0 | 5.10 |
| 4 | | 3.993 | ASP | 0.648 | | | | |
| 5 | Ape. Stop | Planar | | 0.055 | | | | |
| 6 | Lens 3 | 17.757 | | 2.369 | Glass | 1.743 | 49.2 | 4.79 |
| 7 | | −4.203 | | 0.040 | | | | |
| 8 | Lens 4 | 9.499 | ASP | 0.415 | Plastic | 1.661 | 20.3 | −6.49 |
| 9 | | 2.901 | ASP | 0.871 | | | | |
| 10 | Lens 5 | 3.442 | ASP | 0.941 | Plastic | 1.544 | 56.0 | −44.58 |
| 11 | | 2.724 | ASP | 0.400 | | | | |
| 12 | IR Cut Filter | Planar | | 0.300 | Glass | 1.517 | 64.2 | — |
| 13 | | Planar | | 0.528 | | | | |
| 14 | Image Surface | Planar | | — | | | | |

* Reference wavelength is d-line 587.6 nm.
* The effective radius of Surface 1 is 2.900 mm.

TABLE 6

Aspheric Coefficients

| Surface # | 1 | 2 | 3 | 4 |
|---|---|---|---|---|
| k = | −1.0885E+01 | 3.4929E+00 | −2.1508E+00 | −1.6173E+01 |
| A4 = | 9.4238E−03 | 2.2773E−02 | −1.5308E−03 | 1.1216E−02 |
| A6 = | −1.4023E−03 | −3.1428E−03 | 5.3977E−03 | −2.9758E−02 |
| A8 = | 2.4622E−04 | 1.0833E−03 | −9.0748E−03 | 2.0441E−02 |
| A10 = | −2.0301E−05 | −1.4369E−04 | 4.7205E−03 | −7.1876E−03 |
| A12 = | 6.8253E−07 | 1.3014E−05 | −8.4316E−04 | 8.6151E−04 |

| Surface # | 8 | 9 | 10 | 11 |
|---|---|---|---|---|
| k = | 2.7466E+01 | −1.8949E+01 | −1.1999E+01 | −3.5310E−01 |
| A4 = | −9.0038E−02 | −2.0450E−02 | −3.9113E−02 | −5.8622E−02 |
| A6 = | 4.0807E−02 | 9.3493E−03 | 9.4362E−03 | 1.1175E−02 |
| A8 = | −2.2101E−02 | −3.5859E−03 | −2.4916E−03 | −2.0852E−03 |
| A10 = | 5.4455E−03 | 6.5688E−04 | 7.0074E−04 | 2.4543E−04 |
| A12 = | −6.4695E−04 | −4.1780E−05 | −1.2239E−04 | −1.6487E−05 |
| A14 = | | | 1.0538E−05 | 5.2287E−07 |
| A16 = | | | −3.4491E−07 | −7.4935E−09 |

-continued

| 3rd Embodiment | | | |
|---|---|---|---|
| T12/T45 | 0.05 | Y11/Y52 | 0.91 |
| R3/f | 0.38 | | |

4th Embodiment

Figure 4A:
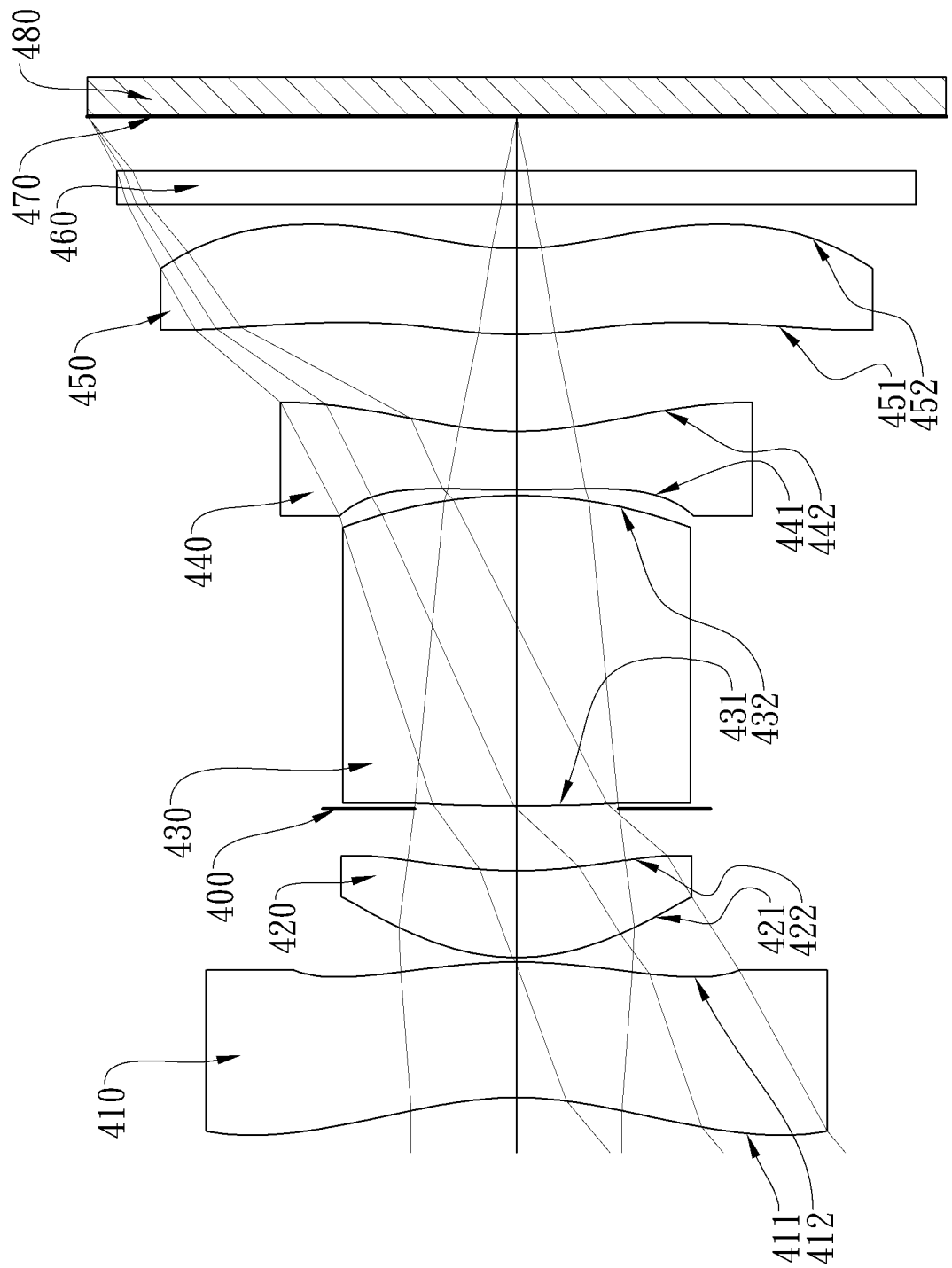
FIG. 4A is a schematic view of an imaging apparatus according to the 4th embodiment of the present disclosure.
Figure 4B:
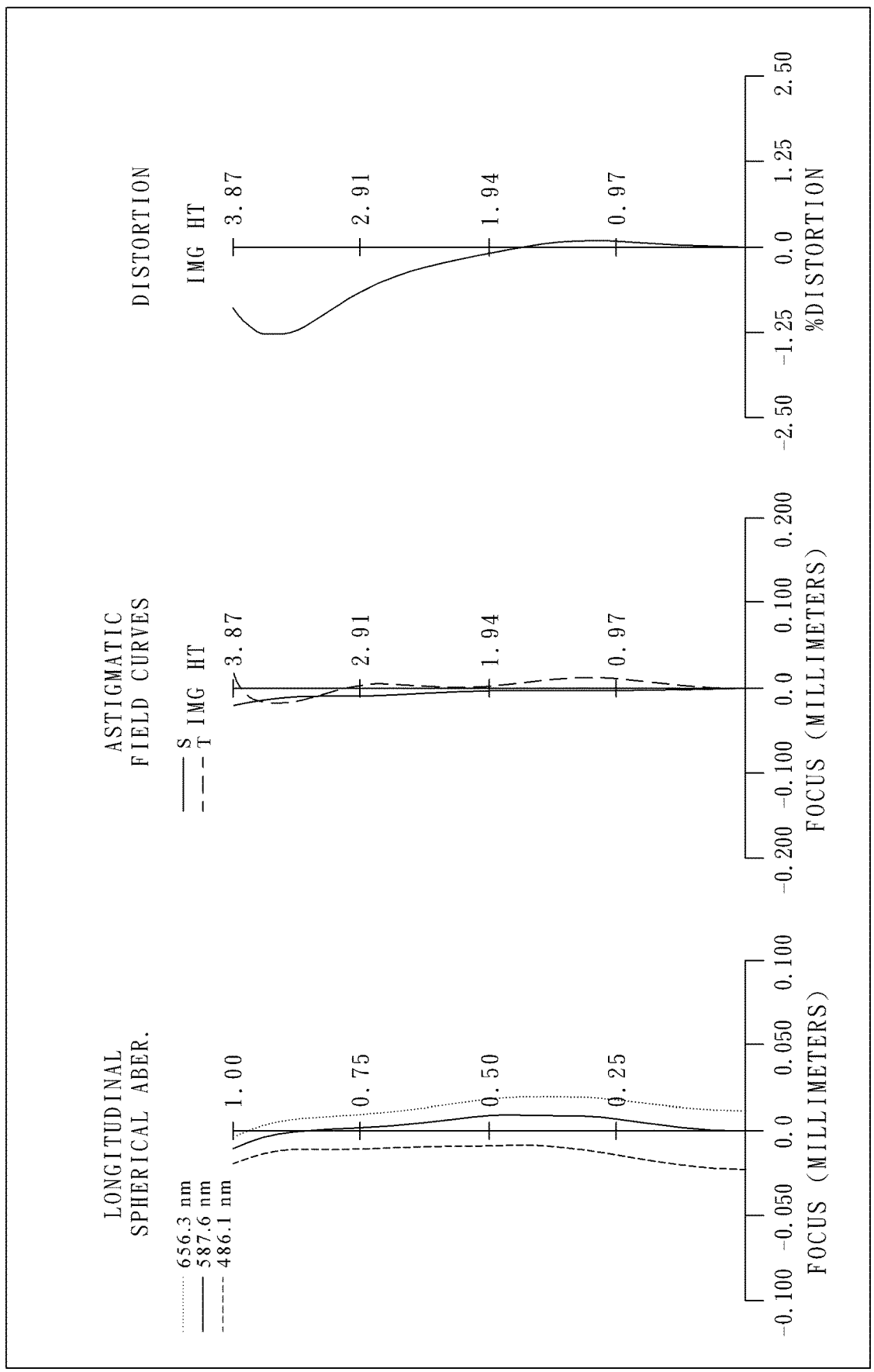
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an optical image capturing system (not otherwise herein labeled) of the present disclosure and an image sensor 480. The optical image capturing system includes five lens elements, the five lens elements being, in order from an object side to an image side, a first lens element 410 a second lens element 420, a third lens element 430, a fourth lens element 440, and a fifth lens element 450 and no other lens elements being inserted between the first lens element 410 and the fifth lens element 450.

The first lens element 410 with negative refractive power has an object-side surface 411 being concave in a paraxial region thereof, an image-side surface 412 being convex in a paraxial region thereof, both the object-side surface 411 and the image-side surface 412 being aspheric, and at least one convex critical point in an off-axis region of the object-side surface 411 thereof. The first lens element 410 is made of plastic material.

The second lens element 420 with positive refractive power has an object-side surface 421 being convex in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, and an image-side surface 432 being convex in a paraxial region thereof. The third lens element 430 is made of glass material.

The fourth lens element 440 with negative refractive power has an object-side surface 441 being convex in a paraxial region thereof, an image-side surface 442 being concave in a paraxial region thereof, and both the object-side surface 441 and the image-side surface 442 being aspheric. The fourth lens element 440 is made of plastic material.

The fifth lens element 450 with negative refractive power has an object-side surface 451 being convex in a paraxial region thereof, an image-side surface 452 being concave in a paraxial region thereof, both the object-side surface 451 and the image-side surface 452 being aspheric, and at least one convex critical point in an off-axis region of the image-side surface 452 thereof. The fifth lens element 450 is made of plastic material.

The optical image capturing system further includes an aperture stop 400 located between the second lens element 420 and the third lens element 430, and an IR cut filter 460 located between the fifth lens element 450 and an image surface 470. The IR cut filter 460 is made of glass material and will not affect the focal length of the optical image capturing system. The image sensor 480 is disposed on or near the image surface 470 of the optical image capturing system.

The detailed optical data of the 4th embodiment are shown in TABLE 7, and the aspheric surface data are shown in TABLE 8, wherein the units of the curvature radius, the thickness and the focal length are expressed in mm, and HFOV is a half of the maximal field of view.

TABLE 7

(4th Embodiment)
f = 4.66 mm, Fno = 2.45, HFOV = 40.0 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −3.089 | ASP | 1.226 | Plastic | 1.584 | 28.2 | −23.33 |
| 2 | | −4.579 | ASP | 0.041 | | | | |
| 3 | Lens 2 | 1.976 | ASP | 0.785 | Plastic | 1.534 | 55.9 | 6.51 |
| 4 | | 3.948 | ASP | 0.562 | | | | |
| 5 | Ape. Stop | Planar | | 0.024 | | | | |
| 6 | Lens 3 | 17.489 | | 2.809 | Glass | 1.772 | 49.6 | 4.86 |
| 7 | | −4.449 | | 0.050 | | | | |
| 8 | Lens 4 | 9.926 | ASP | 0.532 | Plastic | 1.661 | 20.3 | −6.38 |
| 9 | | 2.896 | ASP | 0.878 | | | | |
| 10 | Lens 5 | 3.662 | ASP | 0.777 | Plastic | 1.639 | 23.5 | −24.50 |
| 11 | | 2.722 | ASP | 0.400 | | | | |
| 12 | IR Cut Filter | Planar | | 0.300 | Glass | 1.517 | 64.2 | — |
| 13 | | Planar | | 0.493 | | | | |
| 14 | Image Surface | Planar | | — | | | | |

\* Reference wavelength is d-line 587.6 nm.
\* The effective radius of Surface 1 is 2.810 mm.
\* The effective radius of Surface 8 is 1.600 mm.

TABLE 8

| Aspheric Coefficients | | | | |
|---|---|---|---|---|
| Surface # | 1 | 2 | 3 | 4 |
| k = | −8.5581E+00 | −1.6743E+00 | −1.9244E+00 | −2.4012E+00 |
| A4 = | 1.0389E−02 | 3.0705E−02 | 6.4080E−03 | −2.9983E−02 |
| A6 = | −1.7784E−03 | −8.8396E−03 | −3.5784E−03 | 2.3618E−03 |
| A8 = | 3.2393E−04 | 3.0489E−03 | −2.3804E−03 | 9.0067E−04 |
| A10 = | −2.9367E−05 | −5.3677E−04 | 2.2755E−03 | −6.3420E−04 |
| A12 = | 1.0603E−06 | 4.5739E−05 | −5.1315E−04 | |

| Surface # | 8 | 9 | 10 | 11 |
|---|---|---|---|---|
| k = | 1.9289E+01 | −1.3846E+01 | −6.5408E+00 | −5.4446E+00 |
| A4 = | −6.5695E−02 | −7.9186E−03 | −5.1259E−02 | −3.8556E−02 |
| A6 = | 2.4878E−02 | 2.9480E−03 | 1.3114E−02 | 9.0759E−03 |
| A8 = | −1.7363E−02 | −2.5248E−03 | −1.7062E−03 | −1.6622E−03 |
| A10 = | 5.0807E−03 | 8.6433E−04 | 9.0429E−05 | 2.2110E−04 |
| A12 = | −5.0796E−04 | −1.3229E−04 | 3.1144E−06 | −2.0225E−05 |
| A14 = | −5.9306E−05 | 7.6311E−06 | −5.6373E−07 | 1.0832E−06 |
| A16 = | | | 1.7313E−08 | −2.4665E−08 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 4.66 | R10/f | 0.58 |
| Fno | 2.45 | f/R1 | −1.51 |
| HFOV [deg.] | 40.0 | f/R2 | −1.02 |
| V2/V4 | 2.75 | \|f/f4\| | 0.73 |
| CT3/CT4 | 5.28 | f3/f4 | 0.76 |
| CT5/T45 | 0.88 | \|f4/f2\| + \|f4/f3\| | 2.29 |
| T12/T23 | 0.07 | TL/ImgH | 2.29 |
| T12/T45 | 0.05 | Y11/Y52 | 0.87 |
| R3/f | 0.42 | | |

5th Embodiment

Figure 5A:
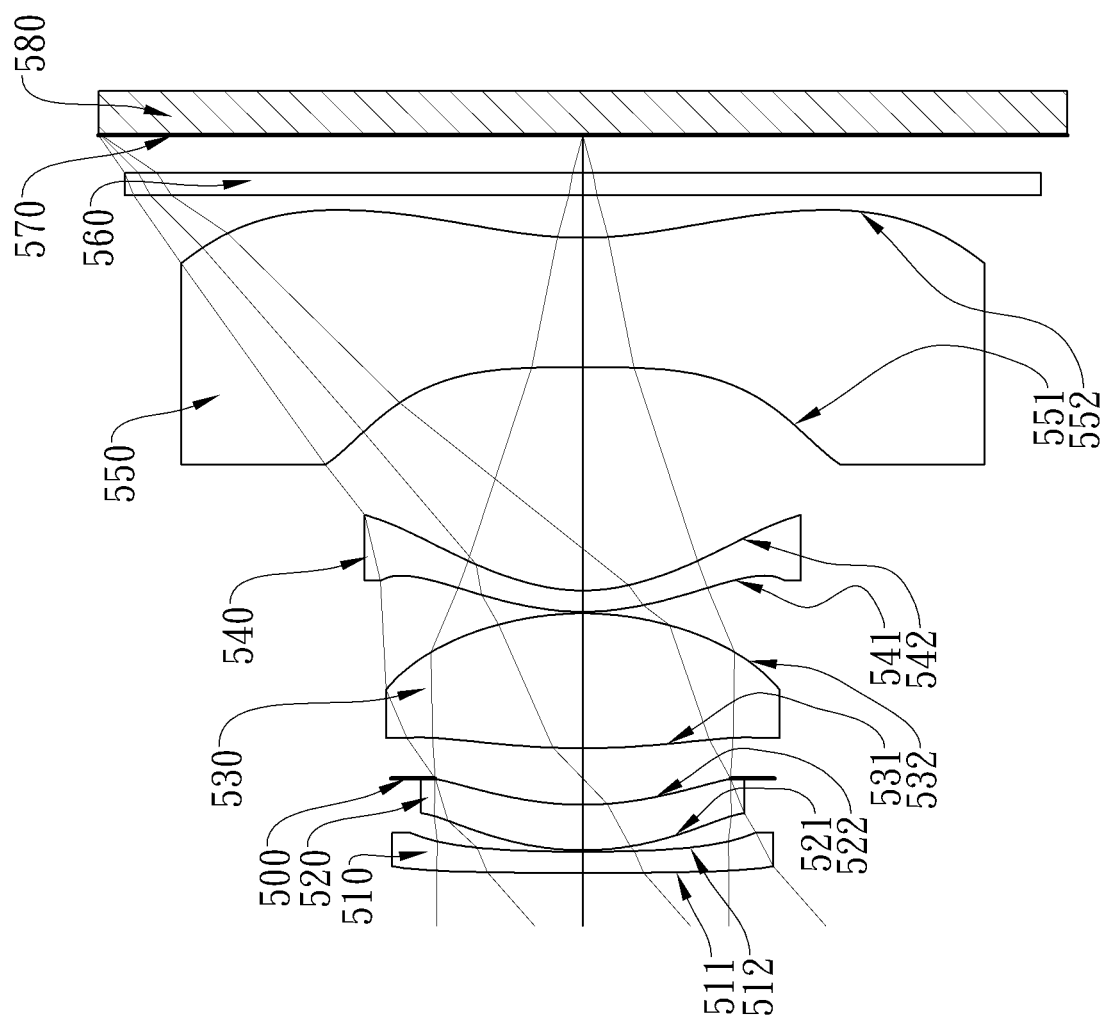
FIG. 5A is a schematic view of an imaging apparatus according to the 5th embodiment of the present disclosure.
Figure 5B:
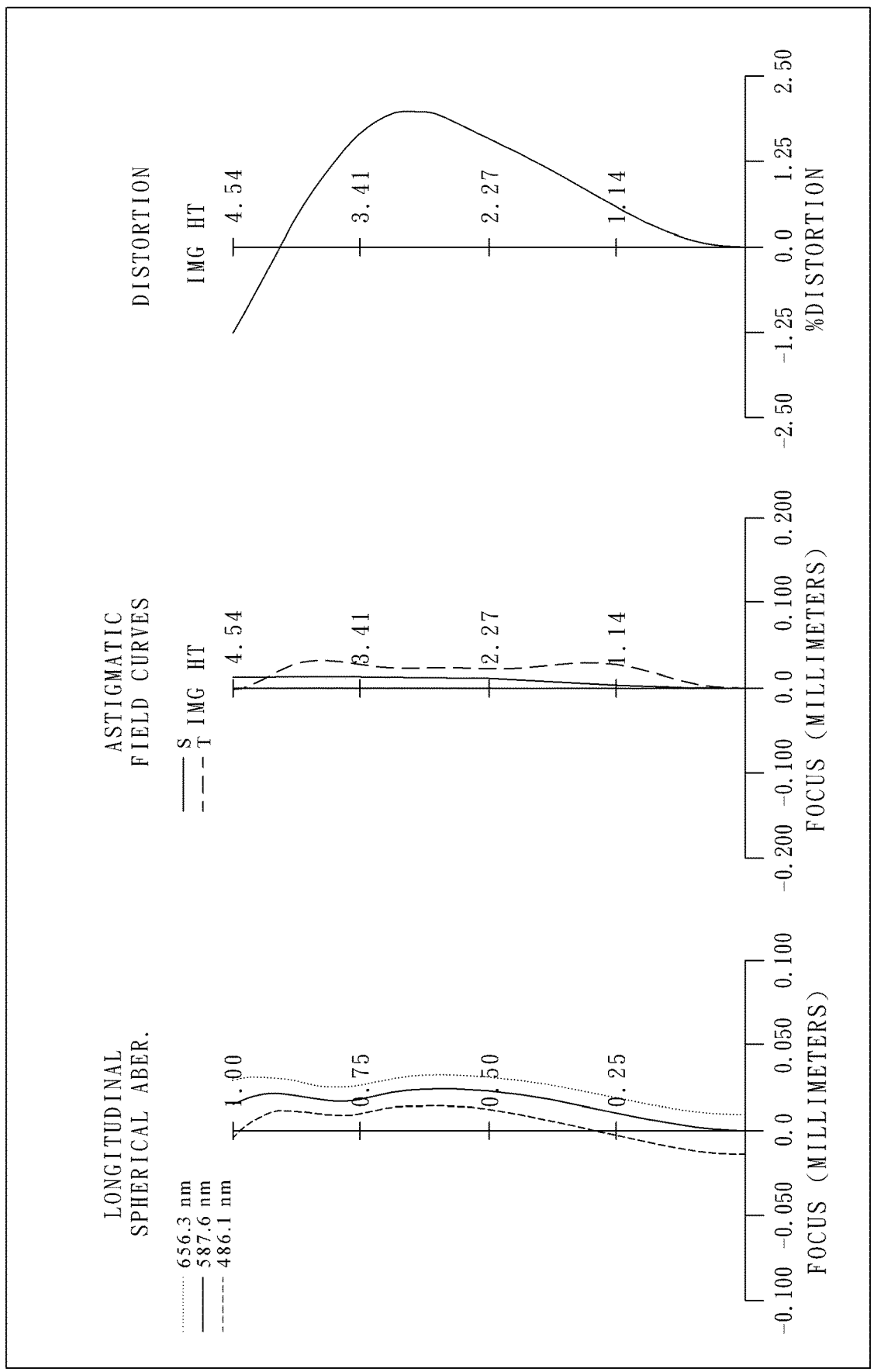
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an optical image capturing system (not otherwise herein labeled) of the present disclosure and an image sensor 580. The optical image capturing system includes five lens elements, the five lens elements being, in order from an object side to an image side, a first lens element 510, a second lens element 520, a third lens element 530, a fourth lens element 540, and a fifth lens element 550 and no other lens elements being inserted between the first lens element 510 and the fifth lens element 550.

The first lens element 510 with negative refractive power has an object-side surface 511 being convex in a paraxial region thereof, an image-side surface 512 being concave in a paraxial region thereof, and both the object-side surface 511 and the image-side surface 512 being aspheric. The first lens element 510 is made of plastic material.

The second lens element 520 with positive refractive power has an object-side surface 521 being convex in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being convex in a paraxial region thereof, an image-side surface 532 being convex in a paraxial region thereof, and both the object-side surface 531 and the image-side surface 532 being aspheric. The third lens element 530 is made of glass material.

The fourth lens element 540 with negative refractive power has an object-side surface 541 being convex in a paraxial region thereof, an image-side surface 542 being concave in a paraxial region thereof, and both the object-side surface 541 and the image-side surface 542 being aspheric. The fourth lens element 540 is made of plastic material.

The fifth lens element 550 with negative refractive power has an object-side surface 551 being concave in a paraxial region thereof, an image-side surface 552 being concave in a paraxial region thereof, both the object-side surface 551 and the image-side surface 552 being aspheric, and at least one convex critical point in an off-axis region of the image-side surface 552 thereof. The fifth lens element 550 is made of plastic material.

The optical image capturing system further includes an aperture stop 500 located between the second lens element 520 and the third lens element 530, and an IR cut filter 560 located between the fifth lens element 550 and an image surface 570. The IR cut filter 560 is made of glass material and will not affect the focal length of the optical image capturing system. The image sensor 580 is disposed on or near the image surface 570 of the optical image capturing system.

The detailed optical data of the 5th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(5th Embodiment)
f = 5.23 mm, Fno = 1.90, HFOV = 41.2 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | 71.930 | ASP | 0.200 | Plastic | 1.669 | 19.5 | −35.25 |
| 2 | | 17.736 | ASP | 0.015 | | | | |
| 3 | Lens 2 | 2.612 | ASP | 0.429 | Plastic | 1.544 | 56.0 | 26.83 |
| 4 | | 2.998 | ASP | 0.247 | | | | |
| 5 | Ape. Stop | Planar | | 0.285 | | | | |
| 6 | Lens 3 | 6.746 | ASP | 1.272 | Glass | 1.632 | 63.8 | 3.42 |
| 7 | | −2.945 | ASP | 0.015 | | | | |
| 8 | Lens 4 | 2.355 | ASP | 0.200 | Plastic | 1.614 | 26.0 | −11.38 |
| 9 | | 1.704 | ASP | 2.105 | | | | |
| 10 | Lens 5 | −37.337 | ASP | 1.221 | Plastic | 1.511 | 56.8 | −6.42 |
| 11 | | 3.636 | ASP | 0.400 | | | | |
| 12 | IR Cut Filter | Planar | | 0.210 | Glass | 1.517 | 64.2 | — |
| 13 | | Planar | | 0.356 | | | | |
| 14 | Image Surface | Planar | | — | | | | |

\* Reference wavelength is d-line 587.6 nm.

TABLE 10

Aspheric Coefficients

| Surface # | 1 | 2 | 3 | 4 | 6 |
|---|---|---|---|---|---|
| k = | 9.0000E+01 | −9.0000E+01 | −3.0944E+00 | −1.7636E+00 | −1.1778E+01 |
| A4 = | 5.5359E−03 | 1.6488E−02 | 3.0426E−03 | −2.2655E−02 | −8.3593E−03 |
| A6 = | −6.3791E−03 | −5.5074E−03 | 2.8608E−03 | 9.2133E−03 | 3.4026E−04 |
| A8 = | 3.9260E−03 | 2.7007E−03 | −3.5013E−03 | −3.2747E−03 | 1.7936E−04 |
| A10 = | −8.8059E−04 | −3.1131E−06 | 1.0510E−03 | −1.0229E−04 | −2.3852E−04 |
| A12 = | 7.0185E−05 | −8.5047E−05 | −3.6164E−04 | | |

| Surface # | 7 | 8 | 9 | 10 | 11 |
|---|---|---|---|---|---|
| k = | −2.6566E−01 | −7.9056E+00 | −4.2579E+00 | 9.0000E+01 | −9.7970E+00 |
| A4 = | 1.0734E−02 | −2.7156E−03 | −7.6814E−03 | −4.1185E−02 | −8.9877E−03 |
| A6 = | −8.5965E−03 | 1.4082E−02 | 2.7286E−02 | 2.6457E−03 | −3.9505E−04 |
| A8 = | 2.2104E−03 | −1.0513E−02 | −1.8271E−02 | 7.8168E−04 | 3.4618E−04 |
| A10 = | −3.5462E−04 | 2.4431E−03 | 5.5108E−03 | −5.0705E−04 | −6.1993E−05 |
| A12 = | | −1.7941E−04 | −8.4875E−04 | 1.0813E−04 | 5.3229E−06 |
| A14 = | | −1.2989E−05 | 5.3827E−05 | −8.6943E−06 | −2.3066E−07 |
| A16 = | | | | 2.3266E−07 | 4.0666E−09 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in table below.

| 5th Embodiment | | | |
|---|---|---|---|
| f [mm] | 5.23 | R10/f | 0.70 |
| Fno | 1.90 | f/R1 | 0.07 |
| HFOV [deg.] | 41.2 | f/R2 | 0.29 |
| V2/V4 | 2.16 | |f/f4| | 0.46 |
| CT3/CT4 | 6.36 | |f3/f4| | 0.30 |
| CT5/T45 | 0.58 | |f4/f2| + |f4/f3| | 3.76 |
| T12/T23 | 0.03 | TL/ImgH | 1.53 |
| T12/T45 | 0.01 | Y11/Y52 | 0.47 |
| R3/f | 0.50 | | |

6th Embodiment

Figure 6A:
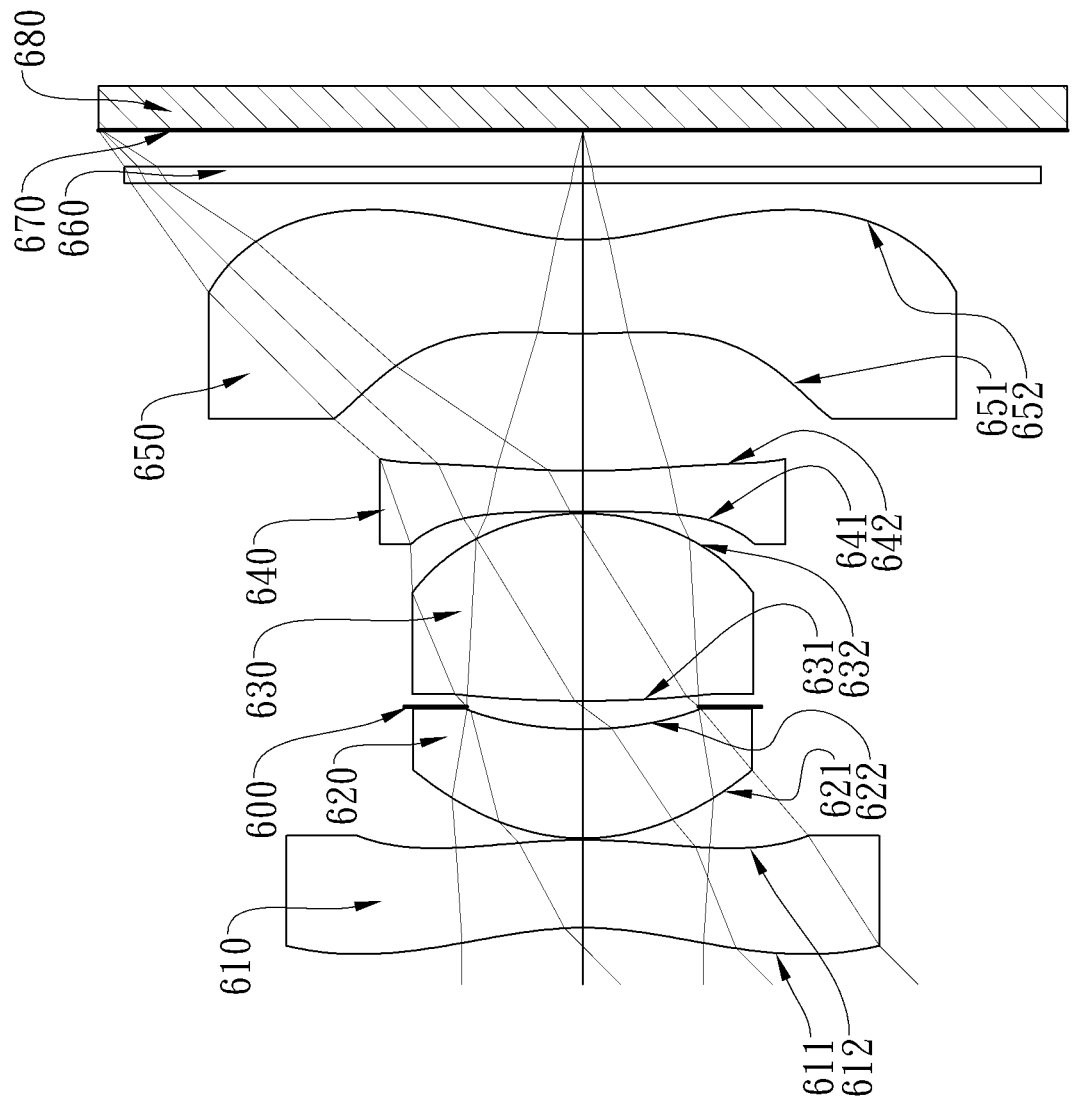
FIG. 6A is a schematic view of an imaging apparatus according to the 6th embodiment of the present disclosure.
Figure 6B:
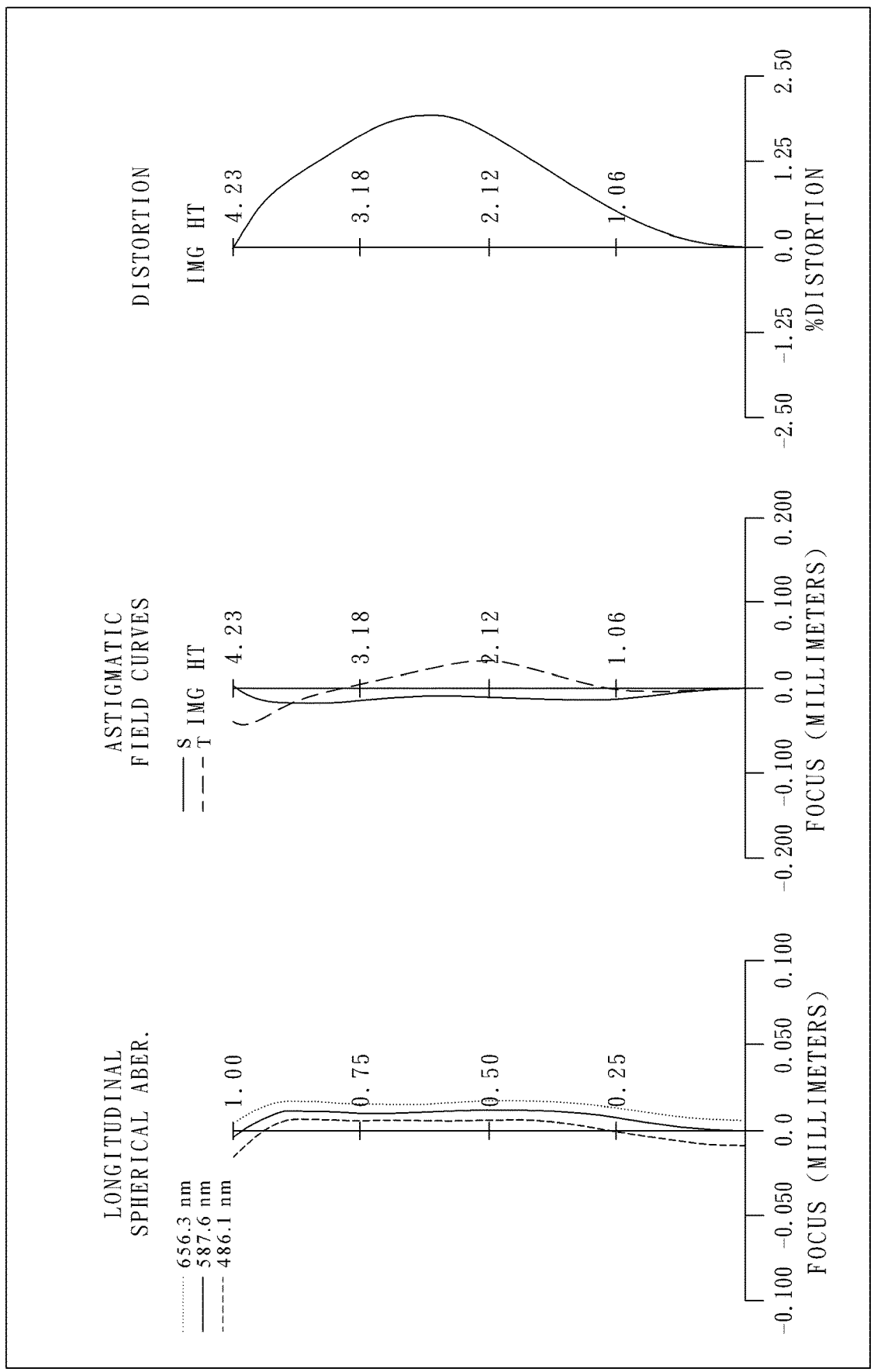
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an optical image capturing system (not otherwise herein labeled) of the present disclosure and an image sensor 680. The optical image capturing system includes five lens elements, the five lens elements being, in order from an object side to an image side, a first lens element 610, a second lens element 620, a third lens element 630, a fourth lens element 640, and a fifth lens element 650 and no other lens elements being inserted between the first lens element 610 and the fifth lens element 650.

The first lens element 610 with negative refractive power has an object-side surface 611 being concave in a paraxial region thereof, an image-side surface 612 being convex in a paraxial region thereof, both the object-side surface 611 and the image-side surface 612 being aspheric, and at least one convex critical point in an off-axis region of the object-side surface 611 thereof. The first lens element 610 is made of plastic material.

The second lens element 620 with positive refractive power has an object-side surface 621 being convex in a paraxial region thereof, an image-side surface 622 being concave in a paraxial region thereof, and both the object-side surface 621 and the image-side surface 622 being aspheric. The second lens element 620 is made of plastic material.

The third lens element 630 with positive refractive power has an object-side surface 631 being convex in a paraxial region thereof, an image-side surface 632 being convex in a paraxial region thereof, and both the object-side surface 631 and the image-side surface 632 being aspheric. The third lens element 630 is made of plastic material.

The fourth lens element 640 with negative refractive power has an object-side surface 641 being concave in a paraxial region thereof, an image-side surface 642 being concave in a paraxial region thereof, and both the object-side surface 641 and the image-side surface 642 being aspheric. The fourth lens element 640 is made of plastic material.

The fifth lens element 650 with negative refractive power has an object-side surface 651 being convex in a paraxial region thereof, an image-side surface 652 being concave in a paraxial region thereof, both the object-side surface 651 and the image-side surface 652 being aspheric, and at least one convex critical point in an off-axis region of the image-side surface 652 thereof. The fifth lens element 650 is made of plastic material.

The optical image capturing system further includes an aperture stop 600 located between the second lens element 620 and the third lens element 630, and an IR cut filter 660 located between the fifth lens element 650 and an image surface 670. The IR cut filter 660 is made of glass material and will not affect the focal length of the optical image capturing system. The image sensor 680 is disposed on or near the image surface 670 of the optical image capturing system.

The detailed optical data of the 6th embodiment are shown in TABLE 11, and the aspheric surface data are shown in TABLE 12, wherein the units of the curvature radius, the thickness and the focal length are expressed in mm, and HFOV is a half of the maximal field of view.

TABLE 11

(6th Embodiment)
f = 4.25 mm, Fno = 2.00, HFOV = 44.9 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −2.987 | ASP | 0.773 | Plastic | 1.584 | 28.2 | −13.61 |
| 2 | | −5.241 | ASP | 0.015 | | | | |
| 3 | Lens 2 | 1.826 | ASP | 0.960 | Plastic | 1.544 | 56.0 | 6.19 |
| 4 | | 3.253 | ASP | 0.197 | | | | |
| 5 | Ape. Stop | Planar | | 0.052 | | | | |
| 6 | Lens 3 | 11.058 | ASP | 1.652 | Plastic | 1.544 | 56.0 | 3.39 |
| 7 | | −2.094 | ASP | 0.015 | | | | |
| 8 | Lens 4 | −189.394 | ASP | 0.358 | Plastic | 1.669 | 19.5 | −9.02 |
| 9 | | 6.239 | ASP | 1.211 | | | | |
| 10 | Lens 5 | 7.761 | ASP | 0.824 | Plastic | 1.544 | 56.0 | −5.81 |
| 11 | | 2.161 | ASP | 0.500 | | | | |
| 12 | IR Cut Filter | Planar | | 0.145 | Glass | 1.517 | 64.2 | — |
| 13 | | Planar | | 0.321 | | | | |
| 14 | Image Surface | Planar | | — | | | | |

\* Reference wavelength is d-line 587.6 nm.

TABLE 12

Aspheric Coefficients

| Surface # | 1 | 2 | 3 | 4 | 6 |
|---|---|---|---|---|---|
| k = | −1.1601E+01 | −1.2015E+01 | −2.2524E+00 | 5.4584E+00 | −1.2097E+01 |
| A4 = | 1.3863E−02 | 3.1657E−02 | 1.5493E−02 | −2.4024E−02 | 6.4678E−04 |
| A6 = | −1.7588E−03 | −8.7276E−03 | 3.2518E−03 | 7.2494E−03 | 1.2414E−02 |
| A8 = | 3.1251E−04 | 3.1340E−03 | −3.3182E−03 | −5.4651E−03 | −1.7200E−02 |
| A10 = | −3.3508E−05 | −5.5042E−04 | 2.0220E−03 | 3.4516E−04 | 7.6370E−03 |
| A12 = | 1.4207E−06 | 3.6173E−05 | −4.6856E−04 | | −5.3619E−04 |

| Surface # | 7 | 8 | 9 | 10 | 11 |
|---|---|---|---|---|---|
| k = | −6.3293E−02 | −9.0000E+01 | −9.0000E+01 | −8.2445E+01 | −5.8134E+00 |
| A4 = | −6.4403E−04 | −5.5435E−02 | −1.0942E−02 | −7.8832E−02 | −3.8470E−02 |
| A6 = | −2.7504E−03 | 2.0529E−02 | 3.5530E−03 | 1.2739E−02 | 9.2767E−03 |
| A8 = | −2.1382E−03 | −1.5026E−02 | −2.1401E−03 | −1.6633E−03 | −1.7545E−03 |
| A10 = | 2.5272E−04 | 3.8567E−03 | 9.3617E−04 | 1.0801E−04 | 2.2600E−04 |
| A12 = | 1.6870E−06 | −4.5781E−04 | −1.2349E−04 | 6.6560E−06 | −1.9917E−05 |
| A14 = | | 9.3525E−07 | 4.3134E−06 | −2.6843E−07 | 1.0859E−06 |
| A16 = | | | | 1.1481E−07 | −2.7610E−08 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 4.25 | R10/f | 0.51 |
| Fno | 2.00 | f/R1 | −1.42 |
| HFOV [deg.] | 44.9 | f/R2 | −0.81 |
| V2/V4 | 2.88 | |f/f4| | 0.47 |
| CT3/CT4 | 4.61 | |f3/f4| | 0.38 |
| CT5/T45 | 0.68 | |f4/f2| + |f4/f3| | 4.12 |
| T12/T23 | 0.06 | TL/ImgH | 1.66 |
| T12/T45 | 0.01 | Y11/Y52 | 0.79 |
| R3/f | 0.43 | | |

7th Embodiment

Figure 7A:
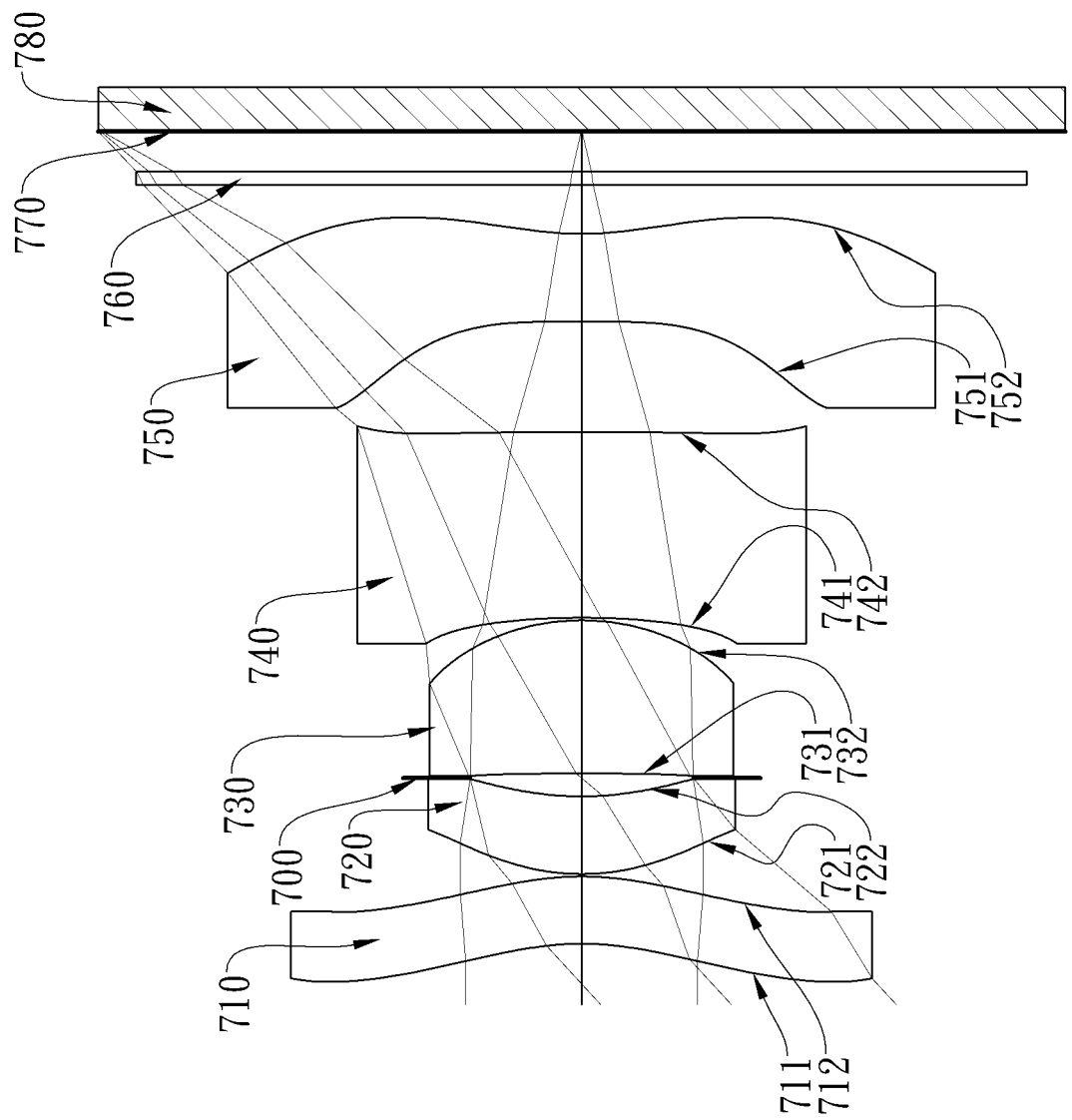
FIG. 7A is a schematic view of an imaging apparatus according to the 7th embodiment of the present disclosure.
Figure 7B:
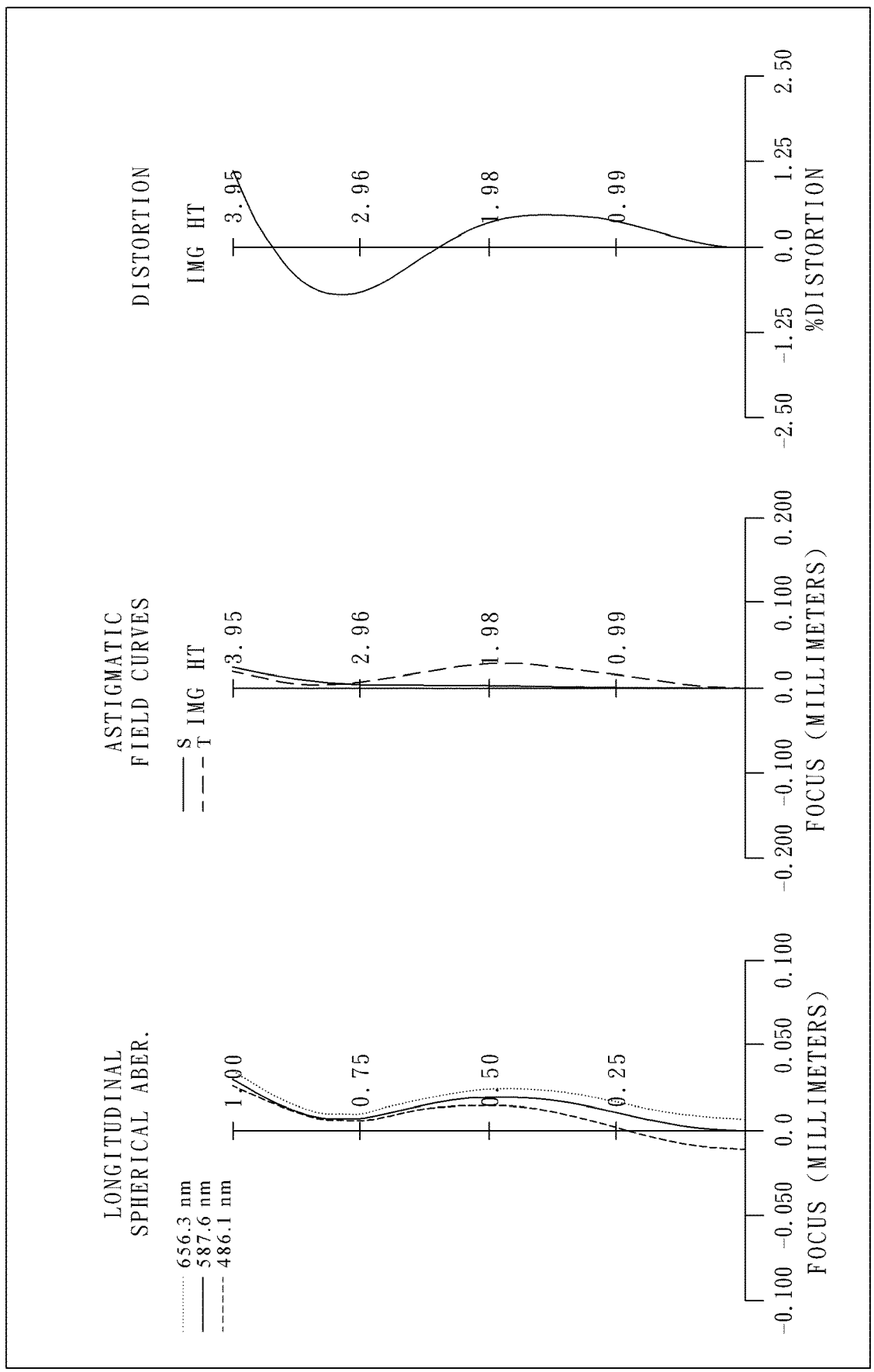
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an optical image capturing system (not otherwise herein labeled) of the present disclosure and an image sensor 780. The optical image capturing system includes five lens elements, the five lens elements being, in order from an object side to an image side, a first lens element 710, a second lens element 720, a third lens element 730, a fourth lens element 740, and a fifth lens element 750 and no other lens elements being inserted between the first lens element 710 and the fifth lens element 750.

The first lens element 710 with positive refractive power has an object-side surface 711 being concave in a paraxial region thereof, an image-side surface 712 being convex in a paraxial region thereof, both the object-side surface 711 and the image-side surface 712 being aspheric, and at least one convex critical point in an off-axis region of the object-side surface 711 thereof. The first lens element 710 is made of plastic material.

The second lens element 720 with positive refractive power has an object-side surface 721 being convex in a paraxial region thereof, an image-side surface 722 being concave in a paraxial region thereof, and both the object-side surface 721 and the image-side surface 722 being aspheric. The second lens element 720 is made of plastic material.

The third lens element 730 with positive refractive power has an object-side surface 731 being concave in a paraxial region thereof, an image-side surface 732 being convex in a paraxial region thereof, and both the object-side surface 731 and the image-side surface 732 being aspheric. The third lens element 730 is made of plastic material.

The fourth lens element 740 with negative refractive power has an object-side surface 741 being concave in a paraxial region thereof, an image-side surface 742 being convex in a paraxial region thereof, and both the object-side surface 741 and the image-side surface 742 being aspheric. The fourth lens element 740 is made of plastic material.

The fifth lens element 750 with negative refractive power has an object-side surface 751 being planar in a paraxial region thereof, an image-side surface 752 being concave in a paraxial region thereof, both the object-side surface 751 and the image-side surface 752 being aspheric, and at least one convex critical point in an off-axis region of the image-side surface 752 thereof. The fifth lens element 750 is made of plastic material.

The optical image capturing system further includes an aperture stop 700 located between the second lens element 720 and the third lens element 730, and an IR cut filter 760 located between the fifth lens element 750 and an image surface 770. The IR cut filter 760 is made of glass material and will not affect the focal length of the optical image capturing system. The image sensor 780 is disposed on or near the image surface 770 of the optical image capturing system.

The detailed optical data of the 7th embodiment are shown in TABLE 13, and the aspheric surface data are shown in TABLE 14, wherein the units of the curvature radius, the thickness and the focal length are expressed in mm, and HFOV is a half of the maximal field of view.

TABLE 13

(7th Embodiment)
f = 4.23 mm, Fno = 2.24, HFOV = 42.6 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −2.389 | ASP | 0.552 | Plastic | 1.545 | 56.0 | 78.04 |
| 2 | | −2.446 | ASP | 0.020 | | | | |
| 3 | Lens 2 | 1.817 | ASP | 0.637 | Plastic | 1.544 | 56.0 | 9.84 |
| 4 | | 2.411 | ASP | 0.151 | | | | |
| 5 | Ape. Stop | Planar | | 0.037 | | | | |
| 6 | Lens 3 | −87.171 | ASP | 1.259 | Plastic | 1.544 | 56.0 | 3.64 |
| 7 | | −1.946 | ASP | 0.021 | | | | |
| 8 | Lens 4 | −7.410 | ASP | 1.524 | Plastic | 1.660 | 20.4 | −11.67 |
| 9 | | −212.766 | ASP | 0.909 | | | | |
| 10 | Lens 5 | ∞ | ASP | 0.723 | Plastic | 1.614 | 26.0 | −4.59 |
| 11 | | 2.815 | ASP | 0.400 | | | | |
| 12 | IR Cut Filter | Planar | | 0.110 | Glass | 1.517 | 64.2 | — |
| 13 | | Planar | | 0.328 | | | | |

TABLE 13-continued (7th Embodiment)
f = 4.23 mm, Fno = 2.24, HFOV = 42.6 deg.

| Surface # | | Curvature Radius | Thickness | Material | Index | Abbe # | Focal Length |
|---|---|---|---|---|---|---|---|
| 14 | Image Surface | Planar | — | | | | |

* Reference wavelength is d-line 587.6 nm.

TABLE 14

Aspheric Coefficients

| Surface # | 1 | 2 | 3 | 4 | 6 |
|---|---|---|---|---|---|
| k = | −8.7699E+00 | −7.8485E+00 | −2.1225E+00 | −2.7264E+00 | 9.0000E+01 |
| A4 = | 1.1909E−02 | 1.9866E−02 | −9.0864E−04 | −6.4585E−02 | −2.4058E−02 |
| A6 = | −5.5233E−04 | −4.2379E−03 | 1.0802E−02 | 9.0619E−02 | 1.9538E−02 |
| A8 = | 4.5730E−05 | 1.1101E−03 | −7.5633E−03 | −7.3125E−02 | −1.9317E−02 |
| A10 = | −1.5171E−05 | −2.1804E−04 | −4.9196E−03 | 2.2367E−02 | −1.6273E−03 |
| A12 = | 2.2493E−06 | 2.1397E−05 | 2.0881E−03 | | |

| Surface # | 7 | 8 | 9 | 10 | 11 |
|---|---|---|---|---|---|
| k = | 3.0768E−01 | 2.7946E+01 | −9.0000E+01 | 0.0000E+00 | −7.0425E+00 |
| A4 = | −2.1216E−02 | −2.9374E−02 | −1.0185E−02 | −1.0160E−01 | −5.8256E−02 |
| A6 = | 2.0141E−02 | 2.7142E−02 | 6.8532E−03 | 1.7880E−02 | 1.7721E−02 |
| A8 = | −9.4126E−03 | −2.1461E−02 | −3.0718E−03 | 2.0933E−03 | −4.0503E−03 |
| A10 = | −1.3053E−03 | 9.7712E−03 | 1.4730E−03 | −3.4737E−03 | 5.8843E−04 |
| A12 = | | −3.1383E−03 | −2.8904E−04 | 1.2307E−03 | −5.0653E−05 |
| A14 = | | 2.1970E−04 | 1.8398E−05 | −1.6690E−04 | 2.3688E−06 |
| A16 = | | | | 7.5028E−06 | −4.6549E−08 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 4.23 | R10/f | 0.67 |
| Fno | 2.24 | f/R1 | −1.77 |
| HFOV [deg.] | 42.6 | f/R2 | −1.73 |
| V2/V4 | 2.74 | \|f/f4\| | 0.36 |
| CT3/CT4 | 0.83 | \|f3/f4\| | 0.31 |
| CT5/T45 | 0.80 | \|f4/f2\| + \|f4/f3\| | 4.39 |
| T12/T23 | 0.11 | TL/ImgH | 1.69 |
| T12/T45 | 0.02 | Y11/Y52 | 0.82 |
| R3/f | 0.43 | | |

8th Embodiment

Figure 8A:
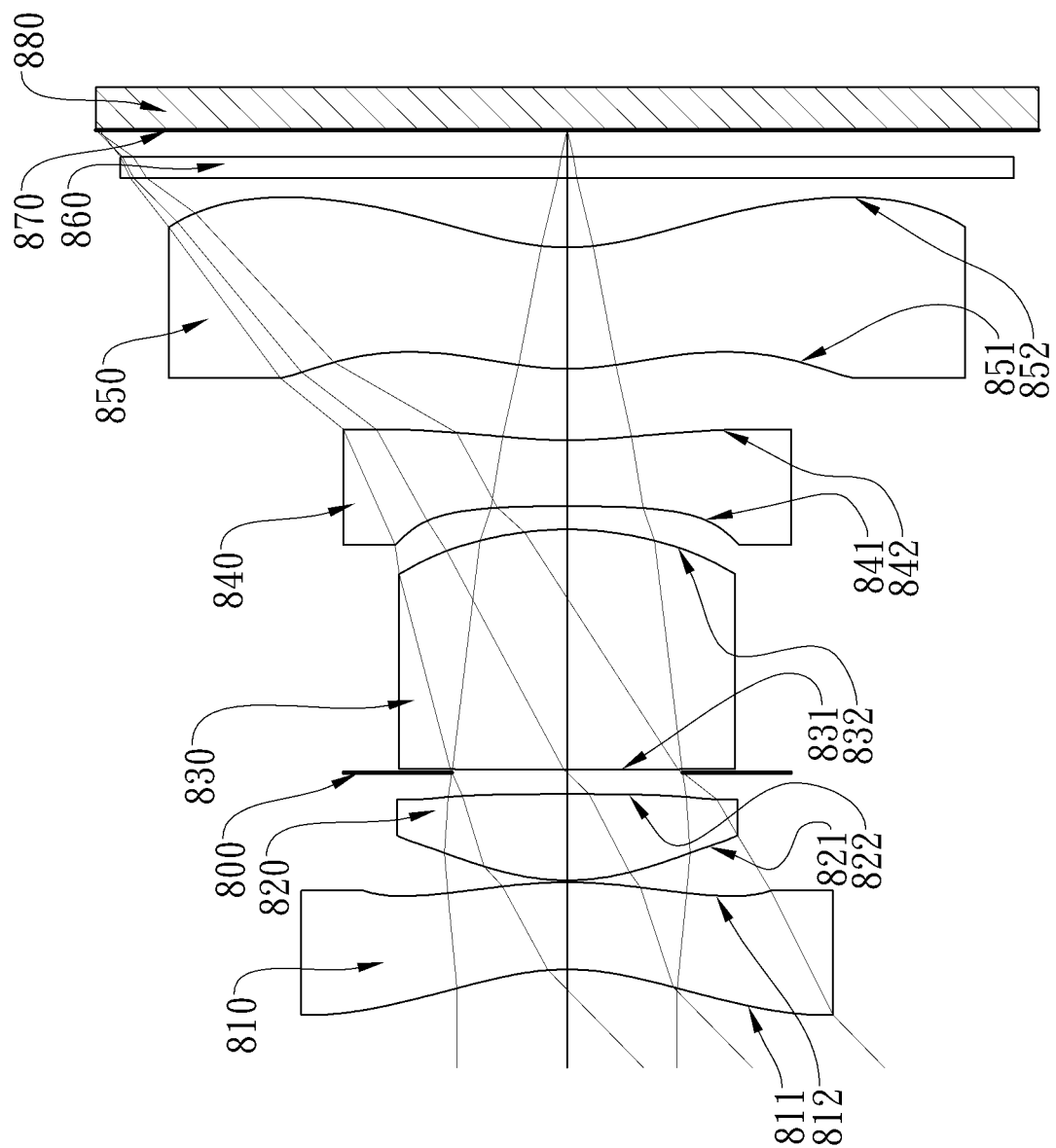
FIG. 8A is a schematic view of an imaging apparatus according to the 8th embodiment of the present disclosure.
Figure 8B:
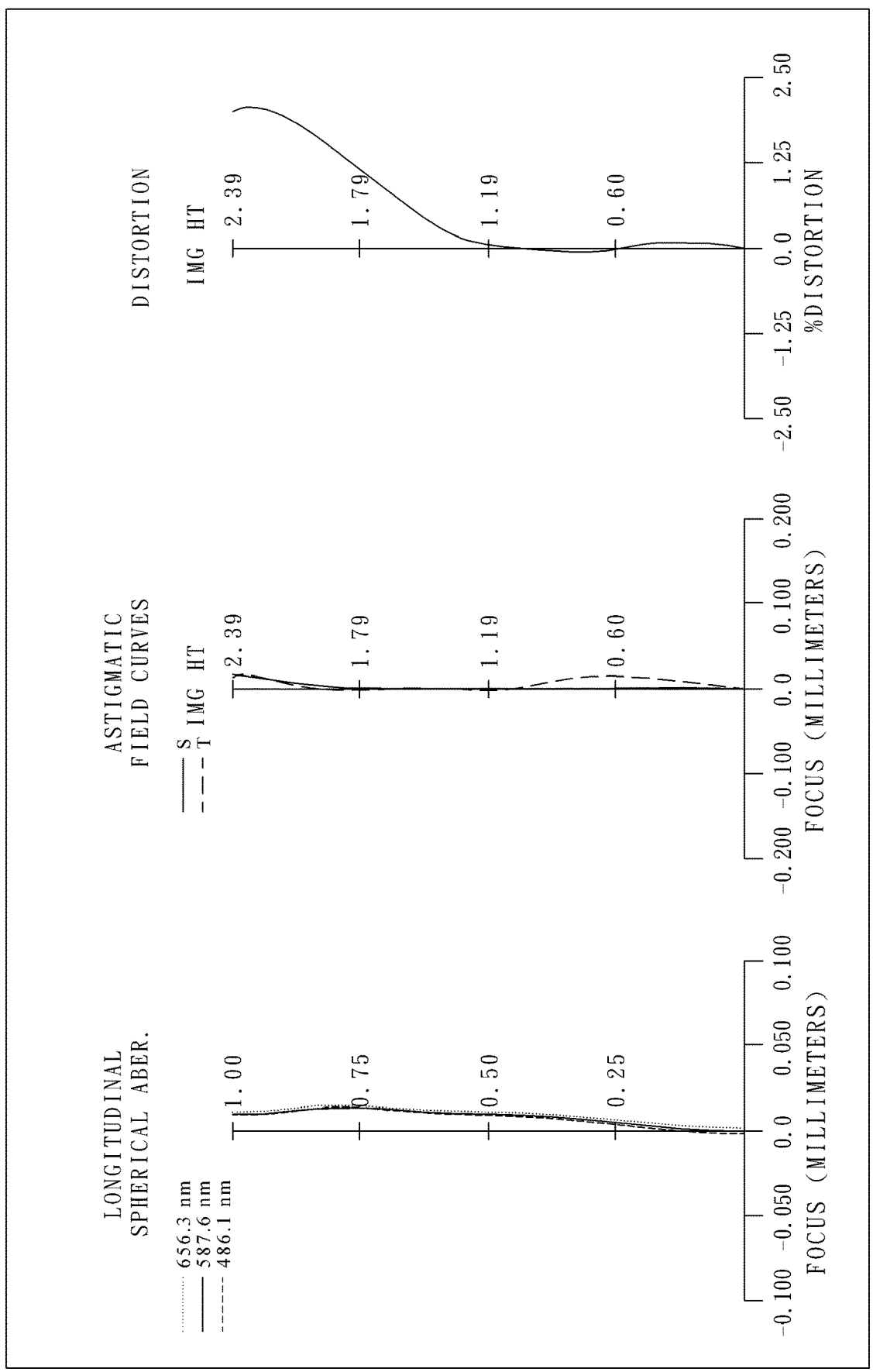
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an optical image capturing system (not otherwise herein labeled) of the present disclosure and an image sensor 880. The optical image capturing system includes five lens elements, the five lens elements being, in order from an object side to an image side, a first lens element 810, a second lens element 820, a third lens element 830, a fourth lens element 840, and a fifth lens element 850 and no other lens elements being inserted between the first lens element 810 and the fifth lens element 850.

The first lens element 810 with negative refractive power has an object-side surface 811 being concave in a paraxial region thereof, an image-side surface 812 being convex in a paraxial region thereof, both the object-side surface 811 and the image-side surface 812 being aspheric, and one convex critical point in an off-axis region of the object-side surface 811 thereof. The first lens element 810 is made of plastic material.

The second lens element 820 with positive refractive power has an object-side surface 821 being convex in a paraxial region thereof, an image-side surface 822 being convex in a paraxial region thereof, and both the object-side surface 821 and the image-side surface 822 being aspheric. The second lens element 820 is made of plastic material.

The third lens element 830 with positive refractive power has an object-side surface 831 being concave in a paraxial region thereof, an image-side surface 832 being convex in a paraxial region thereof, and both the object-side surface 831 and the image-side surface 832 being aspheric. The third lens element 830 is made of plastic material.

The fourth lens element 840 with negative refractive power has an object-side surface 841 being concave in a paraxial region thereof, an image-side surface 842 being concave in a paraxial region thereof, and both the object-side surface 841 and the image-side surface 842 being aspheric. The fourth lens element 840 is made of plastic material.

The fifth lens element 850 with positive refractive power has an object-side surface 851 being convex in a paraxial region thereof, an image-side surface 852 being concave in a paraxial region thereof, both the object-side surface 851 and the image-side surface 852 being aspheric, and at least one convex critical point in an off-axis region of the image-side surface 852 thereof. The fifth lens element 850 is made of plastic material.

The optical image capturing system further includes an aperture stop 800 located between the second lens element 820 and the third lens element 830, and an IR cut filter 860 located between the fifth lens element 850 and an image surface 870. The IR cut filter 860 is made of glass material and will not affect the focal length of the optical image capturing system. The image sensor 880 is disposed on or near the image surface 870 of the optical image capturing system.

The detailed optical data of the 8th embodiment are shown in TABLE 15, and the aspheric surface data are shown in TABLE 16, wherein the units of the curvature radius, the thickness and the focal length are expressed in mm, and HFOV is a half of the maximal field of view.

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
| --- | --- | --- | --- |
| f [mm] | 2.38 | R10/f | 0.49 |
| Fno | 2.13 | f/R1 | −1.94 |
| HFOV [deg.] | 44.4 | f/R2 | −1.04 |
| V2/V4 | 2.76 | \|f/f4\| | 0.78 |
| CT3/CT4 | 3.63 | \|f3/f4\| | 1.19 |
| CT5/T45 | 1.70 | \|f4/f2\| + \|f4/f3\| | 2.29 |
| T12/T23 | 0.08 | TL/ImgH | 1.78 |
| T12/T45 | 0.03 | Y11/Y52 | 0.67 |
| R3/f | 0.49 | | |

TABLE 15

(8th Embodiment)
f = 2.38 mm, Fno = 2.13, HFOV = 44.4 deg.

| Surface # | | Curvature Radius | | Thickness | Material | Index | Abbe # | Focal Length |
| --- | --- | --- | --- | --- | --- | --- | --- | --- |
| 0 | Object | Planar | | Infinity | | | | |
| 1 | Lens 1 | −1.229 | ASP | 0.442 | Plastic | 1.582 | 30.2 | −5.36 |
| 2 | | −2.294 | ASP | 0.010 | | | | |
| 3 | Lens 2 | 1.168 | ASP | 0.437 | Plastic | 1.544 | 56.0 | 2.12 |
| 4 | | −94.162 | ASP | 0.109 | | | | |
| 5 | Ape. Stop | Planar | | 0.017 | | | | |
| 6 | Lens 3 | −16.234 | ASP | 1.218 | Plastic | 1.511 | 56.8 | 3.64 |
| 7 | | −1.709 | ASP | 0.117 | | | | |
| 8 | Lens 4 | −55.714 | ASP | 0.336 | Plastic | 1.660 | 20.3 | −3.07 |
| 9 | | 2.107 | ASP | 0.363 | | | | |
| 10 | Lens 5 | 1.354 | ASP | 0.616 | Plastic | 1.530 | 55.8 | 83.13 |
| 11 | | 1.177 | ASP | 0.350 | | | | |
| 12 | IR Cut Filter | Planar | | 0.110 | Glass | 1.517 | 64.2 | — |
| 13 | | Planar | | 0.136 | | | | |
| 14 | Image Surface | Planar | | — | | | | |

\* Reference wavelength is d-line 587.6 nm.

TABLE 16

Aspheric Coefficients

| Surface # | 1 | 2 | 3 | 4 | 6 |
| --- | --- | --- | --- | --- | --- |
| k = | −6.8689E+00 | −1.2317E+00 | −3.3097E+00 | −9.0000E+01 | −9.0000E+01 |
| A4 = | 7.7624E−02 | 2.3220E−01 | −1.5844E−02 | −1.3155E−01 | 4.7022E−02 |
| A6 = | −4.7271E−02 | −1.6064E−01 | −7.1974E−03 | 2.7829E−01 | 5.2428E−01 |
| A8 = | 3.1106E−02 | 1.0512E−01 | −4.4955E−02 | −7.6292E−01 | −2.7151E+00 |
| A10 = | −1.0330E−02 | −1.6635E−02 | −4.4209E−01 | 8.0507E−01 | 6.7919E+00 |
| A12 = | 1.2569E−03 | 3.4449E−03 | 5.8768E−01 | | −6.0116E+00 |

| Surface # | 7 | 8 | 9 | 10 | 11 |
| --- | --- | --- | --- | --- | --- |
| k = | −2.0753E−01 | −9.0000E+01 | −5.9742E+01 | −1.6391E+01 | −6.7186E+00 |
| A4 = | −1.0688E−02 | −5.5137E−01 | −1.4883E−01 | −3.3489E−01 | −8.0642E−01 |
| A6 = | 3.4800E−01 | 2.1503E+00 | 3.9004E−01 | −3.7402E+00 | −3.0109E+00 |
| A8 = | −7.7542E−01 | −6.5136E+00 | −6.1569E−01 | 1.5240E+01 | 1.6561E+01 |
| A10 = | 1.1159E−01 | 1.1085E+01 | 4.6839E−01 | −2.8484E+01 | −3.5934E+01 |
| A12 = | 4.3469E−01 | −1.1264E+01 | −1.6403E−01 | 2.8170E+01 | 4.0848E+01 |
| A14 = | | 4.9075E+00 | 2.3198E−02 | −1.3850E+01 | −2.4207E+01 |
| A16 = | | | | 2.6234E+00 | 5.9029E+00 |

9th Embodiment

Figure 9A:
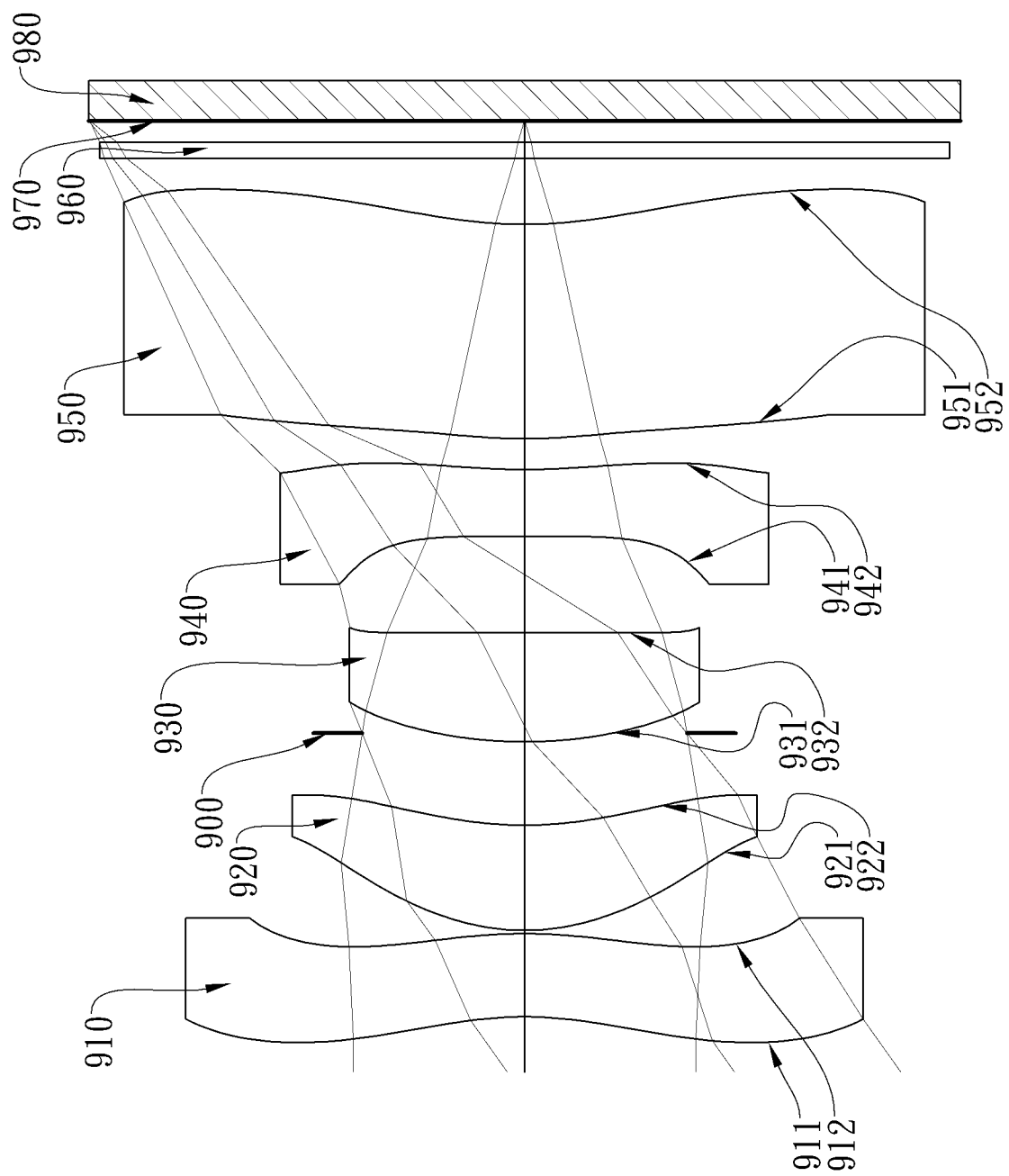
FIG. 9A is a schematic view of an imaging apparatus according to the 9th embodiment of the present disclosure.
Figure 9B:
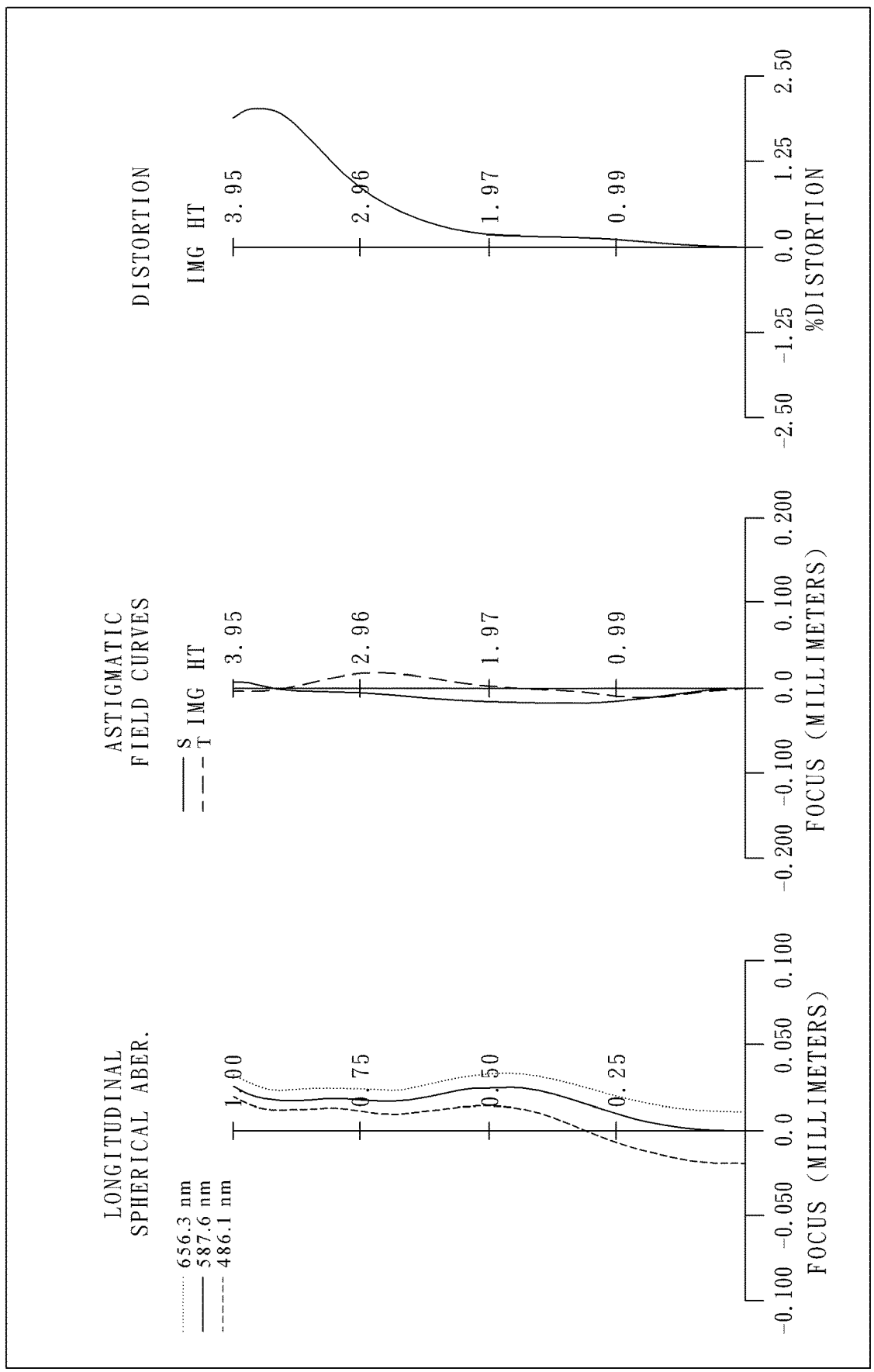
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an optical image capturing system (not otherwise herein labeled) of the present disclosure and an image sensor 980. The optical image capturing system includes five lens elements, the five lens elements being, in order from an object side to an image side, a first lens element 910, a second lens element 920, a third lens element 930, a fourth lens element 940, and a fifth lens element 950 and no other lens elements being inserted between the first lens element 910 and the fifth lens element 950.

The first lens element 910 with negative refractive power has an object-side surface 911 being concave in a paraxial region thereof, an image-side surface 912 being convex in a paraxial region thereof, both the object-side surface 911 and the image-side surface 912 being aspheric, and at least one convex critical point in an off-axis region of the object-side surface 911 thereof. The first lens element 910 is made of plastic material.

The second lens element 920 with positive refractive power has an object-side surface 921 being convex in a paraxial region thereof, an image-side surface 922 being concave in a paraxial region thereof, and both the object-side surface 921 and the image-side surface 922 being aspheric. The second lens element 920 is made of plastic material.

The third lens element 930 with positive refractive power has an object-side surface 931 being convex in a paraxial region thereof, an image-side surface 932 being concave in a paraxial region thereof, and both the object-side surface 931 and the image-side surface 932 being aspheric. The third lens element 930 is made of plastic material.

The fourth lens element 940 with negative refractive power has an object-side surface 941 being convex in a paraxial region thereof, an image-side surface 942 being concave in a paraxial region thereof, and both the object-side surface 941 and the image-side surface 942 being aspheric. The fourth lens element 940 is made of plastic material.

The fifth lens element 950 with positive refractive power has an object-side surface 951 being convex in a paraxial region thereof, an image-side surface 952 being concave in a paraxial region thereof, both the object-side surface 951 and the image-side surface 952 being aspheric, and at least one convex critical point in an off-axis region of the image-side surface 952 thereof. The fifth lens element 950 is made of plastic material.

The optical image capturing system further includes an aperture stop 900 located between the second lens element 920 and the third lens element 930, and an IR cut filter 960 located between the fifth lens element 950 and an image surface 970. The IR cut filter 960 is made of glass material and will not affect the focal length of the optical image capturing system. The image sensor 980 is disposed on or near the image surface 970 of the optical image capturing system.

The detailed optical data of the 9th embodiment are shown in TABLE 17, and the aspheric surface data are shown in TABLE 18, wherein the units of the curvature radius, the thickness and the focal length are expressed in mm, and HFOV is a half of the maximal field of view.

TABLE 17

(9th Embodiment)
f = 5.40 mm, Fno = 1.74, HFOV = 35.5 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −3.301 | ASP | 0.754 | Plastic | 1.669 | 19.5 | −24.22 |
| 2 | | −4.525 | ASP | 0.030 | | | | |
| 3 | Lens 2 | 2.045 | ASP | 0.953 | Plastic | 1.544 | 56.0 | 7.77 |
| 4 | | 3.310 | ASP | 0.834 | | | | |
| 5 | Ape. Stop | Planar | | −0.077 | | | | |
| 6 | Lens 3 | 4.071 | ASP | 0.988 | Plastic | 1.544 | 56.0 | 7.66 |
| 7 | | 163.934 | ASP | 0.873 | | | | |
| 8 | Lens 4 | 39.000 | ASP | 0.607 | Plastic | 1.669 | 19.5 | −8.79 |
| 9 | | 5.079 | ASP | 0.280 | | | | |
| 10 | Lens 5 | 4.339 | ASP | 1.944 | Plastic | 1.511 | 56.8 | 156.11 |
| 11 | | 3.894 | ASP | 0.600 | | | | |
| 12 | IR Cut Filter | Planar | | 0.145 | Glass | 1.517 | 64.2 | — |
| 13 | | Planar | | 0.195 | | | | |
| 14 | Image Surface | Planar | | — | | | | |

\* Reference wavelength is d-line 587.6 nm.

TABLE 18

Aspheric Coefficients

| Surface # | 1 | 2 | 3 | 4 | 6 |
|---|---|---|---|---|---|
| k = | −1.2190E+01 | −8.3930E+00 | −1.7474E+00 | −1.4186E+00 | 3.6992E+00 |
| A4 = | 1.0105E−02 | 2.1684E−02 | −3.2672E−03 | −3.2210E−02 | −1.2258E−02 |
| A6 = | −2.6562E−04 | −2.2257E−03 | 2.6431E−03 | 1.0975E−02 | 1.1732E−02 |
| A8 = | −4.6563E−05 | 4.6476E−04 | 5.8460E−04 | −3.2780E−03 | −1.0604E−02 |

TABLE 18-continued

| Aspheric Coefficients | | | | | |
|---|---|---|---|---|---|
| A10 = | 6.3385E−06 | −8.0171E−05 | −5.3714E−04 | 3.3467E−04 | 4.2774E−03 |
| A12 = | −1.8541E−07 | 6.6090E−06 | 5.9134E−05 | | −6.1945E−04 |

| Surface # | 7 | 8 | 9 | 10 | 11 |
|---|---|---|---|---|---|
| k = | 1.7749E+01 | 3.1209E+01 | −9.0000E+01 | −4.3767E+01 | −1.7809E+00 |
| A4 = | 3.4576E−04 | −5.9259E−02 | −1.5414E−02 | −2.5498E−02 | −5.3844E+00 |
| A6 = | −9.6239E−03 | 4.0081E−02 | 5.9013E−03 | 1.1873E−02 | 1.3587E+01 |
| A8 = | 1.2087E−02 | −4.6250E−02 | −3.2539E−03 | −2.8853E−03 | −2.5807E+01 |
| A10 = | −6.2137E−03 | 2.5978E−02 | 8.6113E−04 | 4.1383E−04 | 3.2089E+01 |
| A12 = | 1.3190E−03 | −8.1221E−03 | −1.0489E−04 | −3.4808E−05 | −2.2035E+01 |
| A14 = | | 1.0414E−03 | 5.2594E−06 | 1.5837E−06 | 5.7178E+00 |
| A16 = | | | | −2.9871E−08 | 2.6555E−01 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 5.40 | R10/f | 0.72 |
| Fno | 1.74 | f/R1 | −1.64 |
| HFOV [deg.] | 35.5 | f/R2 | −1.19 |
| V2/V4 | 2.88 | |f/f4| | 0.61 |
| CT3/CT4 | 1.63 | |f3/f4| | 0.87 |
| CT5/T45 | 6.94 | |f4/f2| + |f4/f3| | 2.28 |
| T12/T23 | 0.04 | TL/ImgH | 2.06 |
| T12/T45 | 0.11 | Y11/Y52 | 0.85 |
| R3/f | 0.38 | | |

10th Embodiment

Figure 10A:
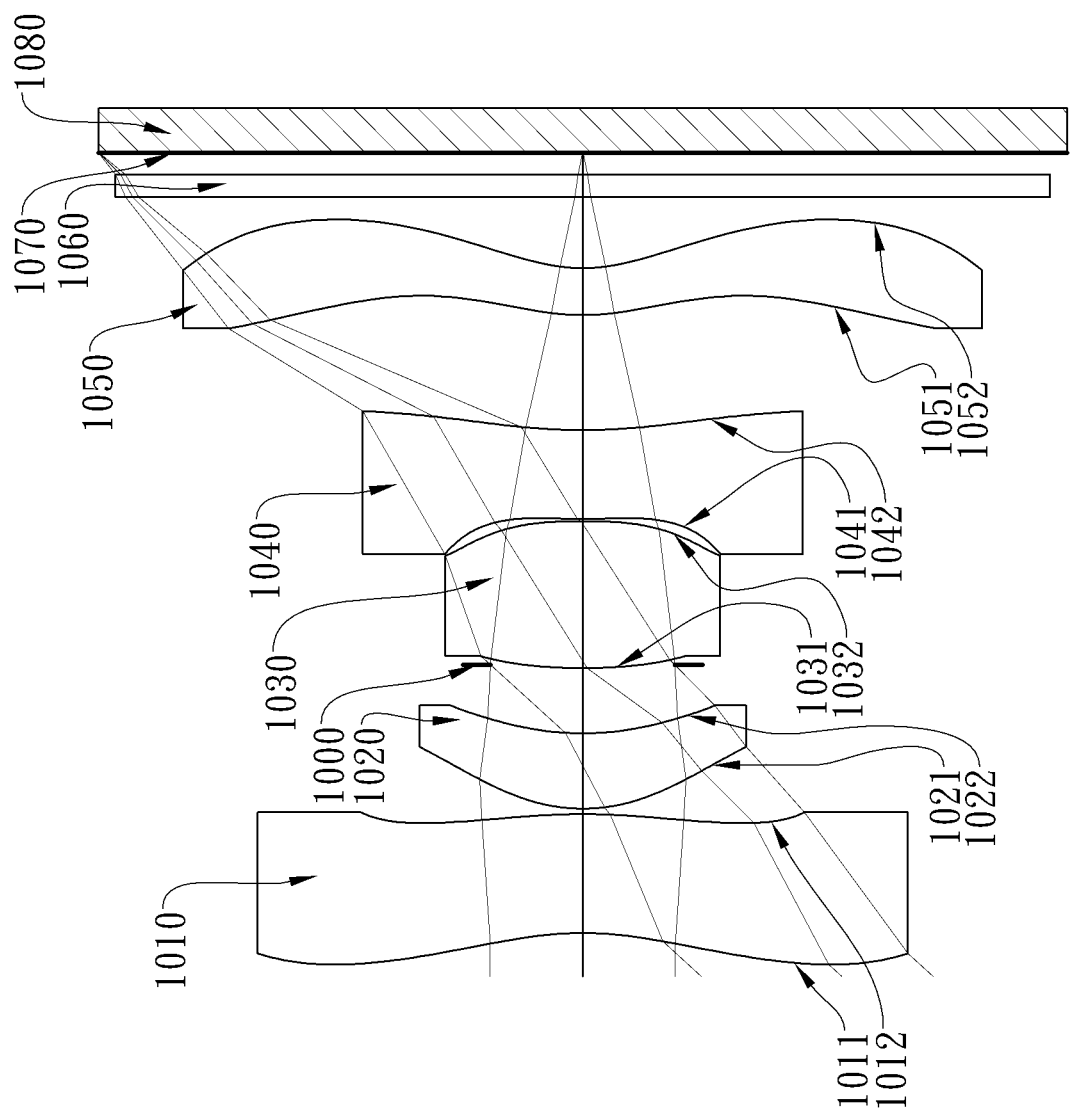
FIG. 10A is a schematic view of an imaging apparatus according to the 10th embodiment of the present disclosure.
Figure 10B:
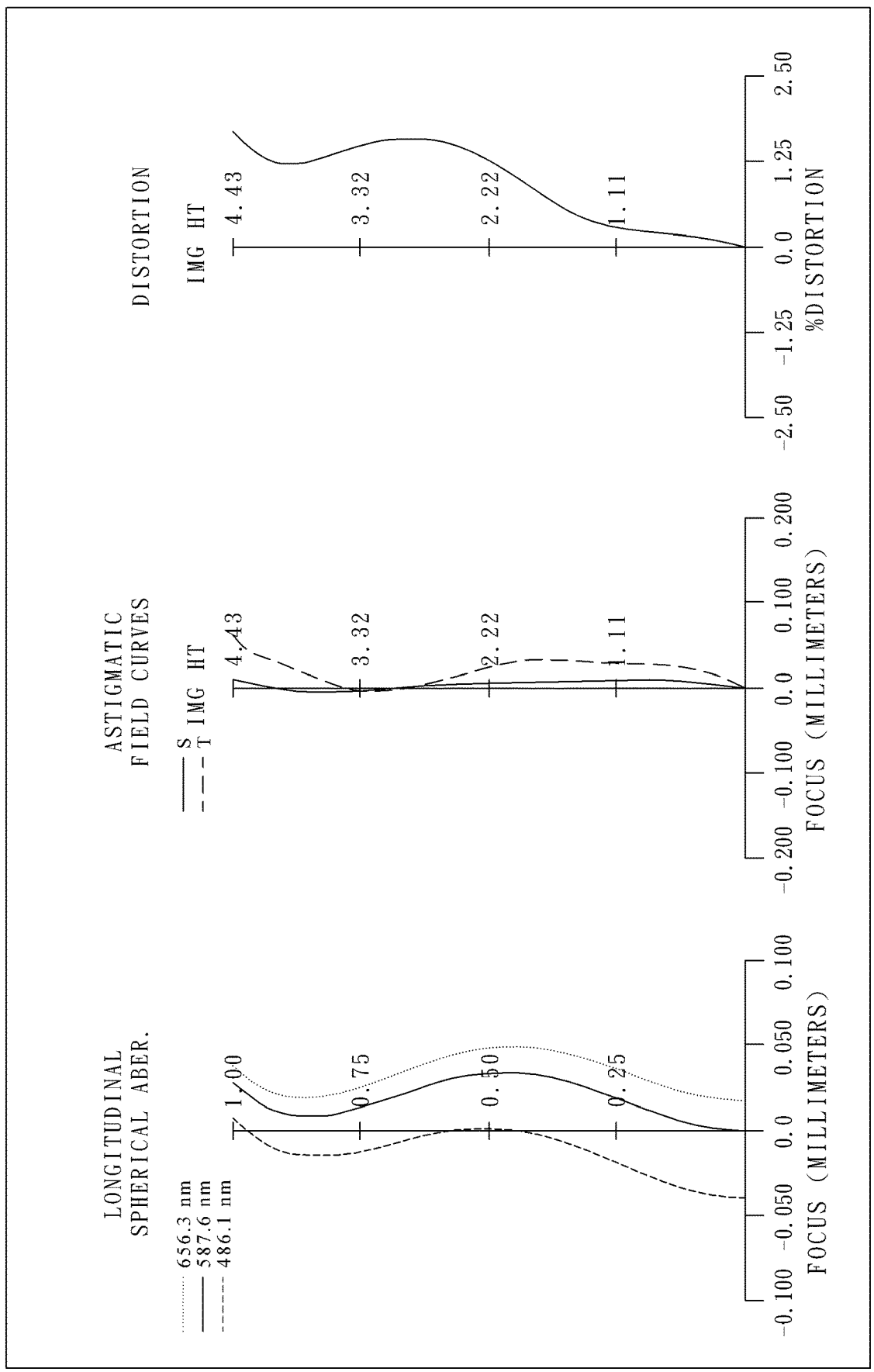
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an optical image capturing system (not otherwise herein labeled) of the present disclosure and an image sensor 1080. The optical image capturing system includes five lens elements, the five lens elements being, in order from an object side to an image side, a first lens element 1010, a second lens element 1020, a third lens element 1030, a fourth lens element 1040, and a fifth lens element 1050 and no other lens elements being inserted between the first lens element 1010 and the fifth lens element 1050.

The first lens element 1010 with negative refractive power has an object-side surface 1011 being concave in a paraxial region thereof, an image-side surface 1012 being convex in a paraxial region thereof, both the object-side surface 1011 and the image-side surface 1012 being aspheric, and one convex critical point in an off-axis region of the object-side surface 1011 thereof. The first lens element 1010 is made of plastic material.

The second lens element 1020 with positive refractive power has an object-side surface 1021 being convex in a paraxial region thereof, an image-side surface 1022 being concave in a paraxial region thereof, and both the object-side surface 1021 and the image-side surface 1022 being aspheric. The second lens element 1020 is made of plastic material.

The third lens element 1030 with positive refractive power has an object-side surface 1031 being convex in a paraxial region thereof, an image-side surface 1032 being convex in a paraxial region thereof, and both the object-side surface 1031 and the image-side surface 1032 being aspheric. The third lens element 1030 is made of plastic material.

The fourth lens element 1040 with positive refractive power has an object-side surface 1041 being convex in a paraxial region thereof, an image-side surface 1042 being concave in a paraxial region thereof, and both the object-side surface 1041 and the image-side surface 1042 being aspheric. The fourth lens element 1040 is made of plastic material.

The fifth lens element 1050 with negative refractive power has an object-side surface 1051 being convex in a paraxial region thereof, an image-side surface 1052 being concave in a paraxial region thereof, both the object-side surface 1051 and the image-side surface 1052 being aspheric, and at least one convex critical point in an off-axis region of the image-side surface 1052 thereof. The fifth lens element 1050 is made of plastic material.

The optical image capturing system further includes an aperture stop 1000 located between the second lens element 1020 and the third lens element 1030, and an IR cut filter 1060 located between the fifth lens element 1050 and an image surface 1070. The IR cut filter 1060 is made of glass material and will not affect the focal length of the optical image capturing system. The image sensor 1080 is disposed on or near the image surface 1070 of the optical image capturing system.

The detailed optical data of the 10th embodiment are shown in TABLE 19, and the aspheric surface data are shown in TABLE 20, wherein the units of the curvature radius, the thickness and the focal length are expressed in mm, and HFOV is a half of the maximal field of view.

TABLE 19

(10th Embodiment)
f = 3.98 mm, Fno = 2.35, HFOV = 47.4 deg.

| Surface # | | Curvature Radius | | Thickness | Material | Index | Abbe # | Focal Length |
|---|---|---|---|---|---|---|---|---|
| 0 | Object | Planar | | Infinity | | | | |
| 1 | Lens 1 | −2.914 | ASP | 1.088 | Plastic | 1.566 | 37.4 | −11.30 |
| 2 | | −6.076 | ASP | 0.050 | | | | |
| 3 | Lens 2 | 1.519 | ASP | 0.691 | Plastic | 1.511 | 56.8 | 6.03 |
| 4 | | 2.532 | ASP | 0.627 | | | | |
| 5 | Ape. Stop | Planar | | −0.030 | | | | |
| 6 | Lens 3 | 4.767 | ASP | 1.345 | Plastic | 1.544 | 56.0 | 6.51 |
| 7 | | −12.419 | ASP | 0.022 | | | | |
| 8 | Lens 4 | 5.275 | ASP | 0.815 | Plastic | 1.582 | 30.2 | 153.90 |
| 9 | | 5.286 | ASP | 1.054 | | | | |
| 10 | Lens 5 | 1.991 | ASP | 0.429 | Plastic | 1.566 | 37.4 | −11.50 |
| 11 | | 1.406 | ASP | 0.650 | | | | |
| 12 | IR Cut Filter | Planar | | 0.210 | Glass | 1.517 | 64.2 | — |
| 13 | | Planar | | 0.201 | | | | |
| 14 | Image Surface | Planar | | — | | | | |

* Reference wavelength is d-line 587.6 nm.

TABLE 20

Aspheric Coefficients

| Surface # | 1 | 2 | 3 | 4 | 6 |
|---|---|---|---|---|---|
| k = | −1.2445E+01 | −1.6829E+00 | −2.0414E+00 | −7.1362E−01 | 8.2192E+00 |
| A4 = | 9.9389E−03 | 2.7083E−02 | 6.3275E−03 | −2.2008E−02 | 7.3476E−03 |
| A6 = | −1.2984E−03 | −5.9058E−03 | 2.7398E−03 | 2.6864E−03 | 1.4396E−02 |
| A8 = | 1.7293E−04 | 1.6660E−03 | −1.2140E−02 | −4.6053E−03 | −2.5386E−02 |
| A10 = | −1.1005E−05 | −2.4624E−04 | 4.7939E−03 | 3.3004E−03 | 2.9850E−02 |
| A12 = | 2.7191E−07 | 2.3760E−05 | −5.2729E−04 | | −1.3964E−02 |

| Surface # | 7 | 8 | 9 | 10 | 11 |
|---|---|---|---|---|---|
| k = | 6.9645E+01 | −9.0000E+01 | −1.1883E+01 | −1.3226E+01 | −6.3161E+00 |
| A4 = | −3.2382E−01 | −2.8121E−01 | 4.6117E−03 | −2.7763E−02 | −2.0514E−02 |
| A6 = | 3.4001E−01 | 2.8394E−01 | −1.7777E−02 | 7.2054E−04 | 2.7161E−03 |
| A8 = | −2.1708E−01 | −3.2194E−01 | 9.8392E−03 | 8.5029E−04 | −2.3351E−04 |
| A10 = | 6.4005E−02 | 2.5108E−01 | −2.8035E−03 | −1.6029E−04 | 6.0900E−06 |
| A12 = | −2.6226E−03 | −1.2741E−01 | 4.1901E−04 | 1.3009E−05 | 8.0357E−07 |
| A14 = | | 2.8446E−02 | −2.5406E−05 | −5.0575E−07 | −8.2192E−08 |
| A16 = | | | | 7.6700E−09 | 2.3142E−09 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 3.98 | R10/f | 0.35 |
| Fno | 2.35 | f/R1 | −1.37 |
| HFOV [deg.] | 47.4 | f/R2 | −0.66 |
| V2/V4 | 1.88 | \|f/f4\| | 0.03 |
| CT3/CT4 | 1.65 | \|f3/f4\| | 0.04 |
| CT5/T45 | 0.41 | \|f4/f2\| + \|f4/f3\| | 49.14 |
| T12/T23 | 0.08 | TL/ImgH | 1.61 |

-continued

| 10th Embodiment | | | |
|---|---|---|---|
| T12/T45 | 0.05 | Y11/Y52 | 0.81 |
| R3/f | 0.38 | | |

11th Embodiment

Figure 12:
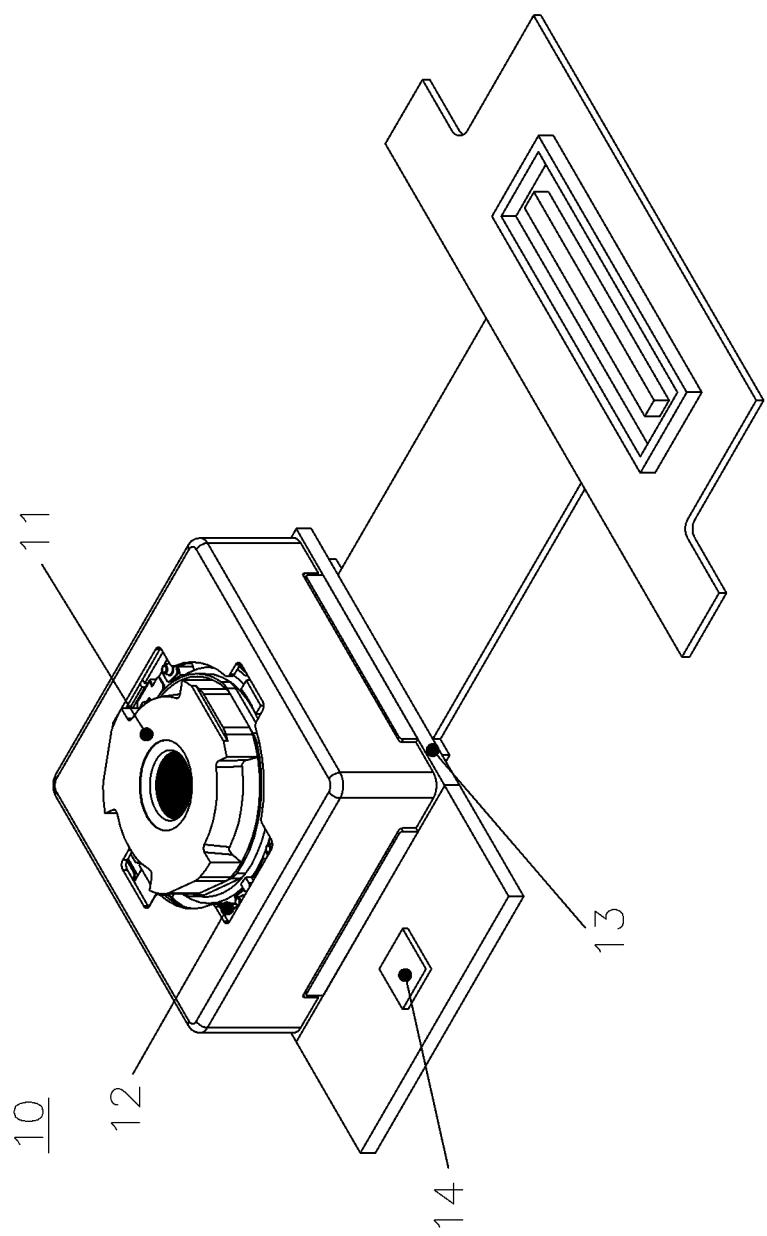
FIG. 12 is a 3-dimensional schematic view of an imaging apparatus according to the 11th embodiment of the present disclosure.

FIG. 12 is a 3-dimensional schematic view of an imaging apparatus 10 according to the 11th embodiment. In the present embodiment, the imaging apparatus 10 is a camera module. The imaging apparatus 10 includes a lens unit 11, a driving device 12, and an image sensor 13. The lens unit 11 includes the optical image capturing system of the 8th embodiment described above, and a lens barrel (not otherwise herein labeled) for carrying the optical image capturing system. The imaging apparatus 10 retrieves light and generates an image by using the lens unit 11, using the driving device 12 to adjust the focus to photograph on the image sensor 13 and outputs the image data thereafter.

The driving device 12 may be an auto-focus model that can be driven by a voice coil motor (VCM), a micro electro-mechanical system (MEMS), a piezoelectric system, shape memory metal or other driving systems. The driving device 12 allows the lens unit 11 to obtain a better imaging position, providing a clear image wherever an imaged object 30 (Please refer to FIG. 13B) being positioned with different object distances.

The imaging apparatus 10 may be configured to equip the image sensor 13 (e.g., CMOS, CCD) with high sensitivity and low noise on the image surface of the optical image capturing system to truly provide the satisfactory image quality obtained from the optical image capturing system.

In addition, the imaging apparatus 10 may further include an image stabilizer 14, which may be a dynamic sensing element such as accelerometer, a gyroscope or a Hall effect sensor. The image stabilizer 14 in the 11th embodiment is a gyroscope but not limited. By adjusting the optical image capturing system in different axial directions to provide a compensation for image blurs due to motion during exposures, the image quality under dynamic and low-light circumstances can be further improved and enhanced image compensation functions such as optical image stabilization (OIS) or electronic image stabilization (EIS) can also be provided.

12th Embodiment

Figure 13A:
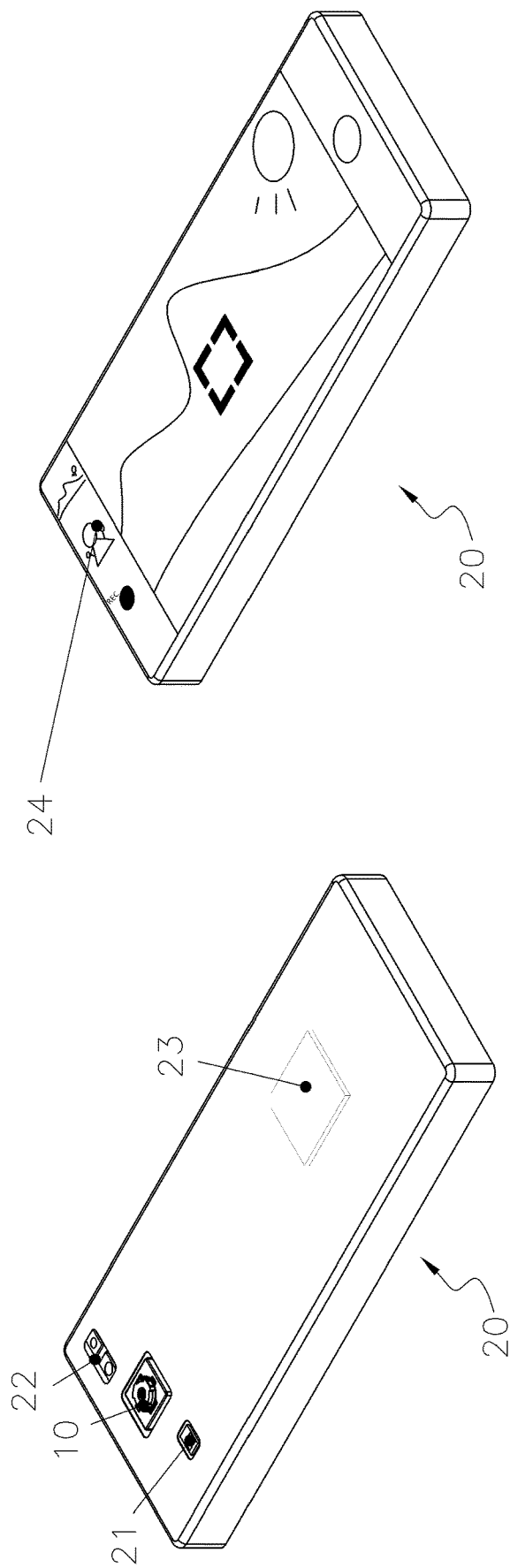
FIG. 13A is a 3-dimensional schematic view of an electronic device according to the 12th embodiment of the present disclosure.
Figure 13B:
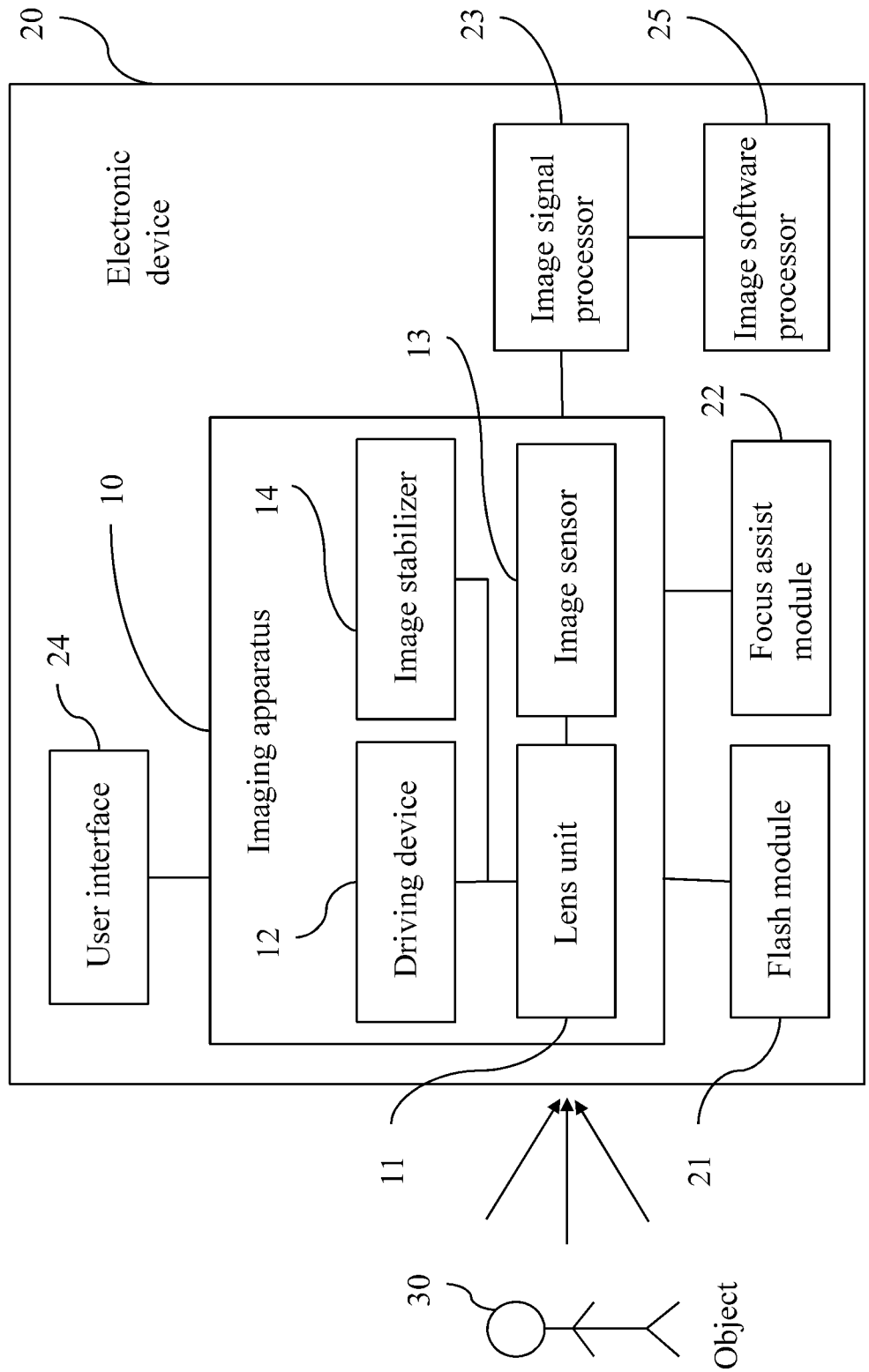
FIG. 13B is a schematic view of the electronic device according to the 12th embodiment.

Please refer to FIG. 13A and FIG. 13B. FIG. 13A is a 3-dimensional schematic view of an electronic device 20 according to the 12th embodiment. FIG. 13B is a schematic view of the electronic device 20 shown in FIG. 13A. In the present embodiment, the electronic device 20 is a smart phone. The electronic device 20 includes the imaging apparatus 10 of the 11th embodiment, a flash module 21, a focus assist module 22, an image signal processor 23, a user interface 24, and an image software processor 25 (Please refer to FIG. 13B).

When a user utilizes the user interface 24 to capture images of the object 30 (Please refer to FIG. 13B), the electronic device 20 retrieves the light and captures an image via the imaging apparatus 10, triggering the flash module 21 to compensate insufficient light level, and focuses instantly according to the distance information of the object 30 provided by the focus assist module 22. The images are further optimized by the image signal processor 23 to further enhance the image quality generated by the optical image capturing system. The focus assist module 22 may adopt an infrared ray or laser focus assist system to achieve quick focusing. The user interface 24 may use a touch screen or a physical shooting button cooperated with various functions of the image software processor 25 to perform image capturing and image processing.

The imaging apparatus 10 of the present disclosure is not limited to be applied to the smart phone. The imaging apparatus 10 may be used in a system of moving focus and features in both excellent aberration correction and satisfactory image quality. For example, the imaging apparatus 10 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices. The aforementioned electronic apparatus is merely exemplary of practical use of the present disclosure and does not limit the scope of application of the imaging apparatus of the present disclosure.

Figure 14A:
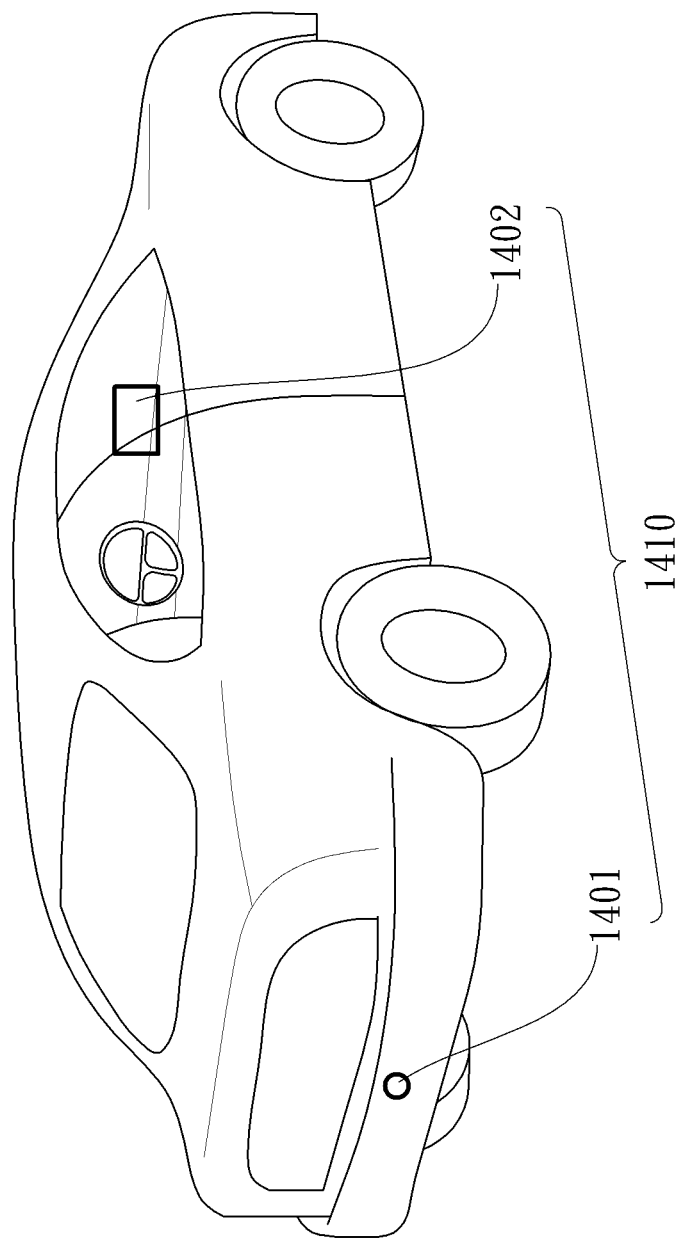
FIG. 14A shows a rear view camera with an imaging apparatus of the present disclosure installed therein.
Figure 14B:
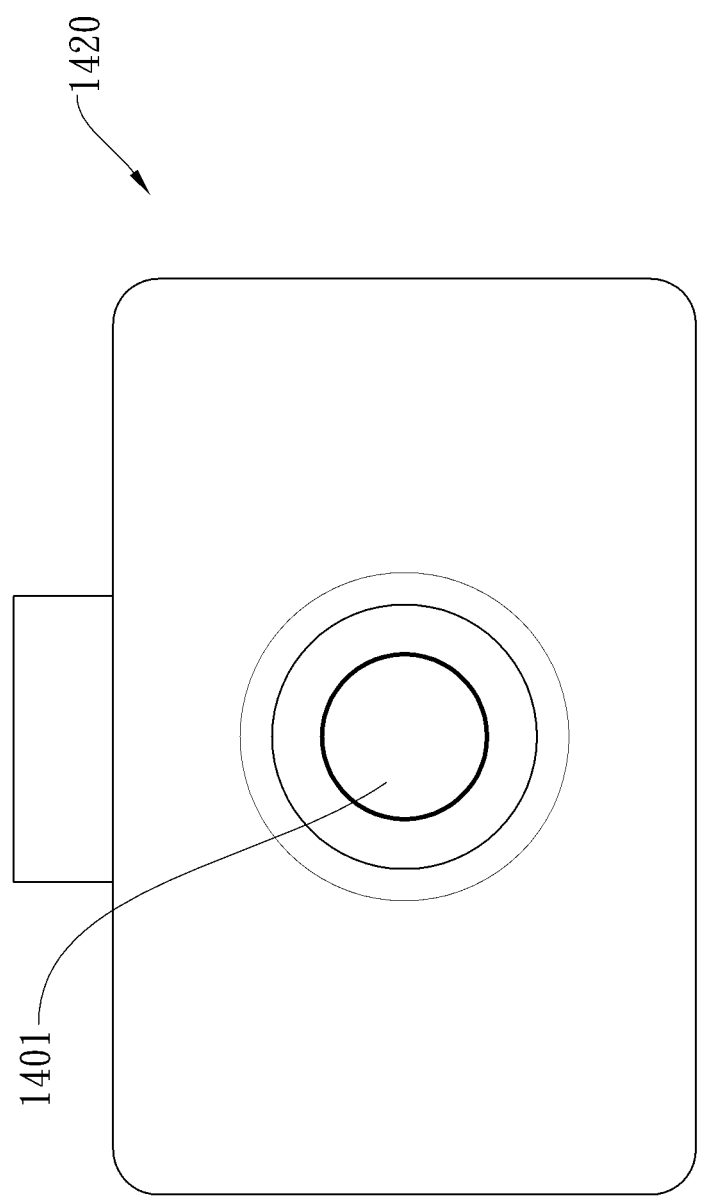
FIG. 14B shows a driving recording system with an imaging apparatus of the present disclosure installed therein.
Figure 14C:
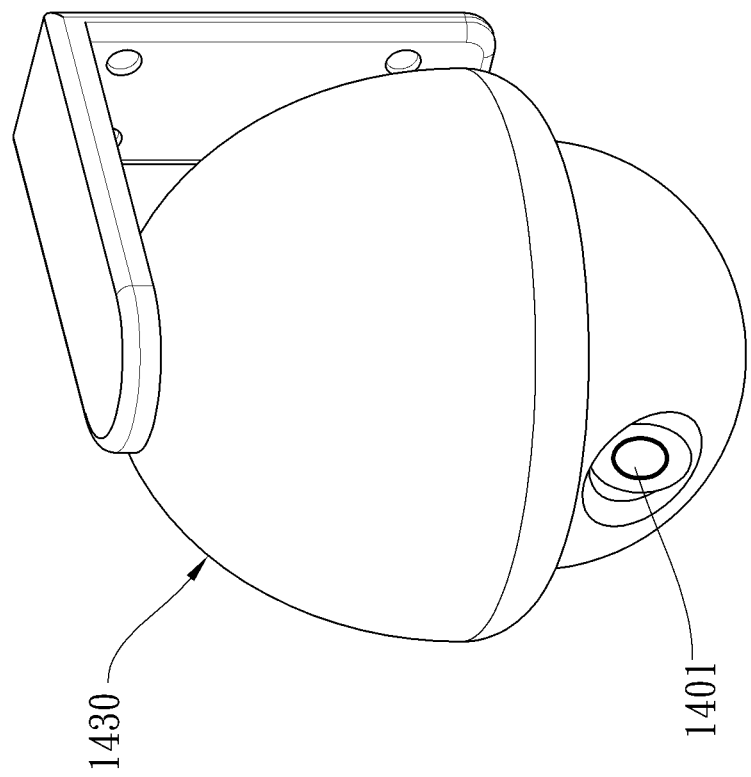
FIG. 14C shows a surveillance camera with an imaging apparatus of the present disclosure installed therein.

Please refer to FIG. 14A, FIG. 14B and FIG. 14C. FIG. 14A shows a rear view camera 1410 with an imaging apparatus 1401 of the present disclosure installed therein. FIG. 14B shows a driving recording system 1420 with the imaging apparatus 1401 of the present disclosure installed therein. FIG. 14C shows a surveillance camera 1430 with the imaging apparatus 1401 of the present disclosure installed therein. Electronic devices equipped with the imaging apparatus 1401 may further include a display screen 1402 to provide images with high imaging quality.

The aforementioned exemplary figures of different electronic devices are only exemplary for showing the imaging apparatus of the present disclosure installed in an electronic device, and the present disclosure is not limited thereto. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image capturing system, comprising five lens elements, the five lens elements being, in order from an object side to an image side:
   a first lens element;
   a second lens element having positive refractive power;
   a third lens element having positive refractive power;
   a fourth lens element; and
   a fifth lens element having an image-side surface being concave in a paraxial region thereof and at least one convex critical point in an off-axis region of the image-side surface thereof,
   wherein the optical image capturing system has a total of five lens elements, an axial distance between the first lens element and the second lens element is T12, an axial distance between the fourth lens element and the fifth lens element is T45, an Abbe number of the second lens element is V2, an Abbe number of the fourth lens element is V4, a focal length of the third lens element is f3, a focal length of the fourth lens element is f4, a central thickness of the third lens element is CT3, a central thickness of the fourth lens element is CT4, and the following conditions are satisfied:

$$0 \leq T12/T45 < 0.40;$$

$$1.2 < V2/V4 < 9.0;$$

$$|f3/f4| < 1.50;$$

$$1.5 < CT3/CT4 < 7.0.$$

2. The optical image capturing system of claim 1, wherein a central thickness of the fifth lens element is CT5, the axial distance between the fourth lens element and the fifth lens element is T45, and the following condition is satisfied:

$$0.20<CT5/T45<1.5.$$

3. The optical image capturing system of claim 1, wherein a focal length of the optical image capturing system is f, the focal length of the fourth lens element is f4, and the following condition is satisfied:

$$0.25<|f/f4|<0.90.$$

4. The optical image capturing system of claim 1, wherein a vertical distance between a maximum effective diameter position on an object-side surface of the first lens element and an optical axis is Y11, a vertical distance between a maximum effective diameter position on the image-side surface of the fifth lens element and the optical axis is Y52, and the following condition is satisfied:

$$0.60<Y11/Y52<1.50.$$

5. The optical image capturing system of claim 1, wherein the first lens element has negative refractive power.

6. The optical image capturing system of claim 1, wherein the first lens element has at least one convex critical point in an off-axis region of an object-side surface thereof.

7. The optical image capturing system of claim 1, wherein the fourth lens element has negative refractive power.

8. The optical image capturing system of claim 1, wherein the fourth lens element has an image-side surface being concave in a paraxial region thereof.

9. The optical image capturing system of claim 1, further comprising an aperture stop, and the aperture stop being disposed between the second lens element and the third lens element.

10. An optical image capturing system, comprising five lens elements, the five lens elements being, in order from an object side to an image side:
   a first lens element;
   a second lens element having positive refractive power;
   a third lens element having positive refractive power;
   a fourth lens element; and
   a fifth lens element having an image-side surface being concave in a paraxial region thereof and at least one convex critical point in an off-axis region of the image-side surface thereof,
   wherein the optical image capturing system has a total of five lens elements, an axial distance between the first lens element and the second lens element is T12, an axial distance between the fourth lens element and the fifth lens element is T45, an Abbe number of the second lens element is V2, an Abbe number of the fourth lens element is V4, a focal length of the optical image capturing system is f, a curvature radius of an object-side surface of the first lens element is R1, and the following conditions are satisfied:

$$0 \leq T12/T45<2.40;$$

$$1.2<V2/V4<9.0;$$

$$f/R1 \leq 0.$$

11. The optical image capturing system of claim 10, wherein the Abbe number of the second lens element is V2, the Abbe number of the fourth lens element is V4, and the following condition is satisfied:

$$1.7<V2/V4<6.0.$$

12. The optical image capturing system of claim 10, wherein a focal length of the third lens element is f3, a focal length of the fourth lens element is f4, and the following condition is satisfied:

$$|f3/f4|<1.50.$$

13. The optical image capturing system of claim 10, wherein a central thickness of the fifth lens element is CT5, the axial distance between the fourth lens element and the fifth lens element is T45, and the following condition is satisfied:

$$0.15<CT5/T45<3.2.$$

14. The optical image capturing system of claim 10, wherein the axial distance between the first lens element and the second lens element is T12, an axial distance between the second lens element and the third lens element is T23, and the following condition is satisfied:

$$0 \leq T12/T23<1.35.$$

15. The optical image capturing system of claim 10, wherein a curvature radius of the image-side surface of the fifth lens element is R10, the focal length of the optical image capturing system is f, and the following condition is satisfied:

$$0<R10/f<1.6.$$

16. The optical image capturing system of claim 10, wherein a focal length of the second lens element is f2, a focal length of the third lens element is f3, a focal length of the fourth lens element is f4, and the following condition is satisfied:

$$2.0<|f4/f2|+|f4/f3|.$$

17. The optical image capturing system of claim 10, wherein the first lens element has at least one convex critical point in an off-axis region of the object-side surface thereof.

18. The optical image capturing system of claim 10, wherein the second lens element has an object-side surface being convex in a paraxial region thereof, a curvature radius of the object-side surface of the second lens element is R3, the focal length of the optical image capturing system is f, and the following condition is satisfied:

$$0.10<R3/f<0.77.$$

19. The optical image capturing system of claim 10, wherein the second lens element has an image-side surface being concave in a paraxial region thereof.

20. The optical image capturing system of claim 10, wherein the fourth lens element has an image-side surface being concave in a paraxial region thereof.

21. An imaging apparatus, comprising the optical image capturing system of claim 10 and an image sensor disposed on an image surface of the optical image capturing system.

22. An electronic device, comprising the imaging apparatus of claim 21.

23. An optical image capturing system, comprising five lens elements, the five lens elements being, in order from an object side to an image side:
   a first lens element;
   a second lens element having positive refractive power;
   a third lens element having positive refractive power;
   a fourth lens element having negative refractive power; and
   a fifth lens element having an image-side surface being concave in a paraxial region thereof and at least one convex critical point in an off-axis region of the image-side surface thereof, wherein the optical image capturing system has a total of five lens elements, an axial distance between the first lens element and the second lens element is T12, an axial distance between the fourth lens element and the fifth lens element is T45, a focal length of the optical image capturing system is f, a curvature radius of an object-side surface of the first lens element is R1, and the following conditions are satisfied:

$0 \leq T12/T45 < 0.90$;

$f/R1 \leq 0$.

24. The optical image capturing system of claim 23, wherein a central thickness of the fifth lens element is CT5, the axial distance between the fourth lens element and the fifth lens element is T45, and the following condition is satisfied:

$0.10 < CT5/T45 < 7.0$.

25. The optical image capturing system of claim 23, wherein the focal length of the optical image capturing system is f, a curvature radius of an image-side surface of the first lens element is R2, an axial distance between the object-side surface of the first lens element and an image surface is TL, a maximum image height of the optical image capturing system is ImgH, and the following conditions are satisfied:

$f/R2 \leq 0$;

$1.0 < TL/ImgH < 3.0$.

26. The optical image capturing system of claim 23, wherein a vertical distance between a maximum effective diameter position on the object-side surface of the first lens element and an optical axis is Y11, a vertical distance between a maximum effective diameter position on the image-side surface of the fifth lens element and the optical axis is Y52, and the following condition is satisfied:

$0.60 < Y11/Y52 < 1.50$.

27. The optical image capturing system of claim 23, wherein the first lens element has at least one convex critical point in an off-axis region of the object-side surface thereof.

28. The optical image capturing system of claim 23, wherein the fifth lens element has negative refractive power.

* * * * *